United States Patent
Bhat

(10) Patent No.: US 12,068,920 B2
(45) Date of Patent: Aug. 20, 2024

(54) METHODS AND SYSTEMS FOR CONTROLLING OPERATIONS OF DEVICES IN AN INTERNET OF THINGS (IOT) ENVIRONMENT

(71) Applicant: Samsung Electronics Co., Ltd., Suwon-si (KR)

(72) Inventor: Karthik Venkatesh Bhat, Karnataka (IN)

(73) Assignee: Samsung Electronics Co., Ltd., Suwon-si (KR)

(*) Notice: Subject to any disclaimer, the term of this patent is extended or adjusted under 35 U.S.C. 154(b) by 48 days.

(21) Appl. No.: 17/510,881

(22) Filed: Oct. 26, 2021

(65) Prior Publication Data

US 2022/0376980 A1    Nov. 24, 2022

Related U.S. Application Data

(63) Continuation of application No. PCT/KR2021/013204, filed on Sep. 28, 2021.

(30) Foreign Application Priority Data

May 19, 2021   (IN) .............................. 202141022425

(51) Int. Cl.
*G06F 15/177*     (2006.01)
*G16Y 30/00*      (2020.01)
(Continued)

(52) U.S. Cl.
CPC .......... *H04L 41/0893* (2013.01); *G16Y 30/00* (2020.01); *G16Y 40/30* (2020.01); *H04L 67/125* (2013.01); *H04L 67/303* (2013.01)

(58) Field of Classification Search
CPC . H04L 41/0893; H04L 67/125; H04L 67/303; H04L 67/12; H04L 12/282;
(Continued)

(56) References Cited

U.S. PATENT DOCUMENTS 9,111,441 B2    8/2015    Yano et al.
9,292,832 B2    3/2016    Goel et al.
(Continued)

FOREIGN PATENT DOCUMENTS

| CN | 111107492 A    | 5/2020  |
| EP | 3 389 226 A1   | 10/2018 |
| WO | 2020/149548 A1 | 7/2020  |

OTHER PUBLICATIONS

International Search Report with Written Opinion dated Feb. 15, 2022; International Appln. No. PCT/KR2021/013204.
(Continued)

*Primary Examiner* — Dustin Nguyen
*Assistant Examiner* — Hao H Nguyen
(74) *Attorney, Agent, or Firm* — Jefferson IP Law, LLP

(57) ABSTRACT

A system and method are provided for controlling operations of devices in an IoT environment based on a correlation between devices. The controlled operations include identifying a first device in response to a user pointing the electronic device toward the first device, determining at least one second device contextually related to the first device, and recommending at least one suggestion to control at least one operation of at least one of the first device or the at least one second device, based on a correlation between capabilities of the first device and a current operating context of the at least one second device.

21 Claims, 24 Drawing Sheets

(51) Int. Cl.
*G16Y 40/30* (2020.01)
*H04L 41/0893* (2022.01)
*H04L 67/125* (2022.01)
*H04L 67/303* (2022.01)

(58) Field of Classification Search
CPC ..... H04L 65/1073; H04W 4/80; G16Y 30/00; G16Y 40/30; G16Y 10/75; G16Y 40/35
See application file for complete search history.

(56) References Cited

U.S. PATENT DOCUMENTS

| | | | |
|---|---|---|---|
| 10,185,934 B2 | 1/2019 | Gupta | |
| 10,834,237 B2 | 11/2020 | Sun | |
| 11,177,836 B1* | 11/2021 | Thantharate | H04M 1/72454 |
| 2008/0178214 A1* | 7/2008 | Shivaji-Rao | H04N 21/485 348/E5.105 |
| 2008/0237337 A1* | 10/2008 | Drackett | G06Q 40/00 235/380 |
| 2009/0249460 A1* | 10/2009 | Fitzgerald | H04L 63/12 709/206 |
| 2014/0228063 A1 | 8/2014 | Harris et al. | |
| 2016/0050083 A1* | 2/2016 | Kang | H04L 12/2818 455/420 |
| 2017/0139847 A1* | 5/2017 | Lim | G06F 13/102 |
| 2017/0236514 A1* | 8/2017 | Nelson | G10L 15/22 704/257 |
| 2018/0342151 A1* | 11/2018 | VanBlon | G06F 3/011 |
| 2019/0208024 A1* | 7/2019 | Jablonski | G06Q 20/308 |
| 2019/0347560 A1 | 11/2019 | Jaiswal et al. | |
| 2020/0007518 A1 | 1/2020 | Funk | |
| 2020/0106632 A1* | 4/2020 | Lewis | H04L 67/51 |
| 2021/0109754 A1 | 4/2021 | Mese et al. | |
| 2021/0274008 A1* | 9/2021 | Bender | H04L 67/12 |
| 2022/0150324 A1* | 5/2022 | Seed | H04L 67/564 |
| 2022/0155738 A1* | 5/2022 | Qiao | G08C 17/02 |
| 2022/0158894 A1* | 5/2022 | Moulik | H04L 41/142 |
| 2022/0201078 A1* | 6/2022 | Jain | H04L 67/12 |
| 2022/0310066 A1* | 9/2022 | Choi | G06F 3/16 |
| 2022/0376986 A1* | 11/2022 | Sheppard | H04L 41/06 |

OTHER PUBLICATIONS

Xiaomi Team; "Xiaomi Introduces Groundbreaking UWB Technology" —Mi Blog; Oct. 13, 2020; Beijing, CN [https://blog.mi.com/en/2020/10/13/xiaomi-introduces-groundbreaking-uwb-technology/] retrieved from Internet Oct. 6, 2021.
Indian Examination Report dated Feb. 17, 2023, issued in Indian Patent Application No. 202141022425.
Ioannis Barakos et al., Context-aware management of multi-device services in the home, Jan. 1, 2011, XP055557984.
Partial European Search Report dated Apr. 4, 2024, issued in European Patent Application No. 21940933.1.

* cited by examiner

FIG. 9B

| Candidate Device State/Context | Pointed Device State/Context |
|---|---|
| speaker:<br>[ context= {location: "Hall",<br>state: "Playing Content",<br>capability: "volume", "media playback"<br>],<br>camera:<br>[ context= {location: "Lobby",<br>state: "No Movement Captured",<br>capability: "video feed"<br>]<br>oven:[<br>context= {location: "Kitchen",<br>state: "Off",<br>capability: "video feed", "temperature"<br>] | tv:<br>[ context= {location: "Hall",<br>sate: "On",<br>capability: "volume", "media playback", "video playback"<br>] |

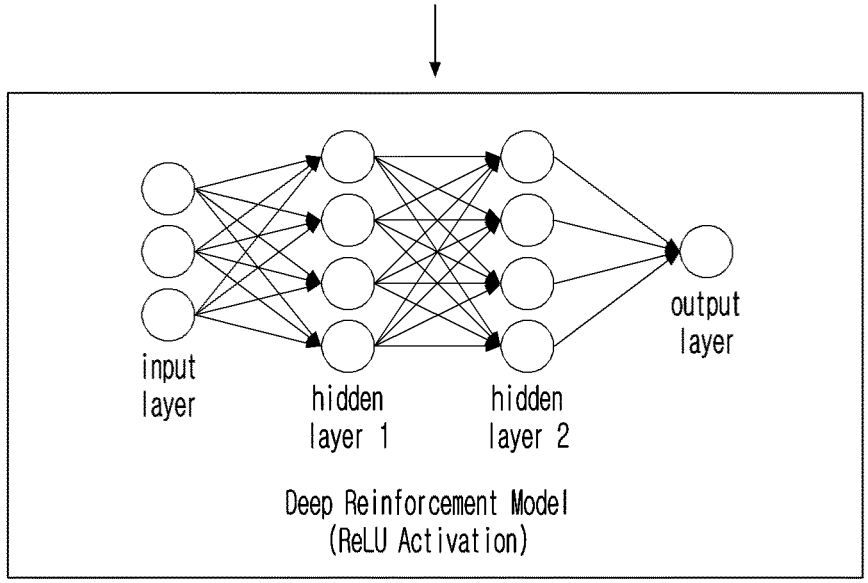

Deep Reinforcement Model
(ReLU Activation)

| Pointed Device | Correlation Device | Conflict Confidence |
|---|---|---|
| TV | Speaker | 10% |
| TV | Camera | 8% |
| TV | Oven | 7% |
| TV | SmartPlug | 75% |

FIG. 10B

| Candidate Device State/Context | Pointed Device State/Context |
|---|---|
| speaker:<br>[ context= {location: "Hall",<br>state: "Playing Content",<br>capability: "volume", "media playback"<br>],<br>camera:<br>[ context= {location: "Lobby",<br>state: "No Movement Captured",<br>capability: "video feed"<br>]<br>oven:[<br>context= {location: "Kitchen",<br>state: "Off",<br>capability: "video feed", "temperature"<br><br>] | tv:<br>[ context= {location: "Hall",<br>sate: "On",<br>capability: "volume", "media playback", "video playback"<br>] |

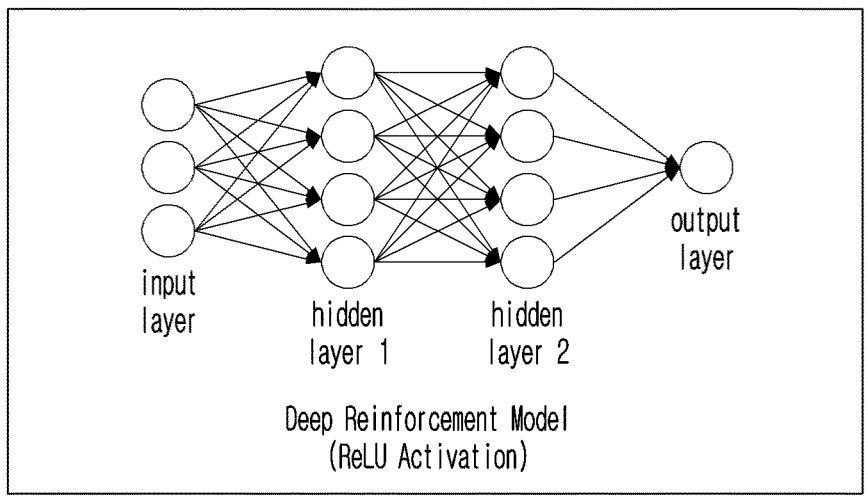

Deep Reinforcement Model
(ReLU Activation)

| Pointed Device | Correlation Device | Failure Confidence |
|---|---|---|
| TV | Speaker | 10% |
| TV | Camera | 10% |
| TV | Oven | 10% |
| TV | SmartPlug | 70% |

METHODS AND SYSTEMS FOR CONTROLLING OPERATIONS OF DEVICES IN AN INTERNET OF THINGS (IOT) ENVIRONMENT

CROSS-REFERENCE TO RELATED APPLICATION(S)

This application is a continuation application, claiming priority under § 365(c), of an International application No. PCT/KR2021/013204, filed on Sep. 28, 2021, which is based on and claims the benefit of an Indian patent application number 202141022425, filed on May 19, 2021, in the Indian Intellectual Property Office, the disclosure of which is incorporated by reference herein in its entirety.

BACKGROUND

1. Field

The disclosure relates to the field of Internet of Things (IoT) environment. More particularly, the disclosure relates to controlling operations of devices in an IoT environment based on a correlation between devices.

2. Description of Related Art

In general, an Internet of Things (IoT) environment includes a plurality of devices with which users may interact and control their operations. In conventional approaches, a user may point a device for controlling, using Ultra-Wideband (UWB) technology supported by a user device. On pointing the device, the user device controls the pointed device. In an example, the normal controls may include at least one of, turning ON/OFF of the pointed device, settings of the pointed device, and so on. However, context of other devices dependent on the pointed device may affect the operations of the pointed device.

The above information is presented as background information only, and to assist with an understanding of the disclosure. No determination has been made, and no assertion is made, as to whether any of the above might be applicable as prior art with regard to the disclosure.

Consider an example scenario, wherein the user may point the user device towards a washing machine, an example device deployed in the IoT environment, to control using the UWB technology supported by the user device. In such a scenario, the user device provides normal controls such as, turning ON of the washing machine, settings of the washing machine for modification, and so on, for controlling the operation of the washing machine. However, low water level in a tank may affect the operation of the washing machine.

Thus, the conventional approaches do not involve providing suggestions to the user for controlling the pointed device based on the current context of the one or more other devices in the IoT environment dependent on the pointed device.

SUMMARY

Aspects of the disclosure are to address at least the above-mentioned problems and/or disadvantages and to provide at least the advantages described below. Accordingly, an aspect of the disclosure is to provide methods and systems for controlling operations of a plurality of devices in an Internet of Things (IoT) environment.

Another aspect of the disclosure is to provide methods and systems for identifying a first device of the plurality of devices for pointed for controlling and determining at least one second device contextually related to the first device.

Another aspect of the disclosure is to provide methods and systems for recommending at least one suggestion to control at least one operation of at least one of, the first device and the at least one second device, based on a correlation between capabilities of the first device and a current operating context of the at least one second device.

Additional aspects will be set forth in part in the description which follows and, in part, will be apparent from the description, or may be learned by practice of the presented embodiments.

In accordance with an aspect of the disclosure, a method for controlling operations of devices in an Internet of Things (IoT) environment is provided. The method includes identifying a first device in response to a user pointing the electronic device towards the first device, determining at least one second device contextually related to the first device, and recommending at least one suggestion to control at least one operation of at least one of the first device and the at least one second device, based on a correlation between capabilities of the first device and a current operating context of the at least one second device.

In accordance with another aspect of the disclosure, the first device may be pointed by a user using Ultra-Wideband (UWB) supported by the electronic device.

In accordance with another aspect of the disclosure, the method includes identifying at least first set of relevant devices for the first device using a capability based device clustering model, identifying at least one second set of relevant devices for the first device using a device interaction prediction model, creating a union of the at least one first set of relevant devices and the at least one second set of relevant devices, wherein the created union is a set including at least one device present in either the at least one first set of relevant devices or the at least one second set of relevant devices, and determining the at least one device present either in the first set of relevant devices or the at least one second set of relevant devices as the at least one second device contextually related to the first device.

In accordance with another aspect of the disclosure, identifying the at least one first set of relevant devices for the first device includes fetching a list of registered devices in the IoT environment from a device database, wherein the device database includes the list of devices registered by the user on deploying each device in the IoT environment and the associated capabilities, identifying the capabilities of the first device and each registered device using the device database, and forming a cluster of devices for the first device based on the identified capabilities of the first device and each registered device, wherein the formed cluster of devices includes the at least first set of relevant devices from the list of devices that has the similar capabilities of the first device.

In accordance with another aspect of the disclosure, identifying the at least one second set of relevant devices for the first device includes fetching the list of registered devices from the device database, identifying the capabilities of the first device and each registered device using the device database, computing and assigning a confidence score for each registered device with respect to the first device, by matching the capabilities of each device with the capabilities of the first device, discarding at least one device from the list of registered devices that is associated with the confidence score less than a device interaction threshold, and identifying at least one set of devices from the list of registered devices that is associated with the confidence score greater than or equal to the device interaction threshold as the at least one second set of relevant devices for the first device.

In accordance with another aspect of the disclosure, recommending, by the electronic device, the at least one suggestion to control the at least one operation of at least one of, the first device and the at least one second device includes identifying a type of data to be collected from the first device and the at least one second device, wherein the data of each device corresponds to at least one of, a state, a content, a location, and the current operating context of the corresponding device, collecting the identified type of data from the first device and the at least one second device in an online mode or in an offline mode, determining the correlation between the first device and the at least one second device based on the data collected from the first device and the at least one second device and the capabilities of the first device and the at least one second device, and recommending the at least one suggestion to control the at least one operation of at least one of, the first device and the at least one second device based on the determined correlation between the first device and the at least one second device.

In accordance with another aspect of the disclosure, identifying the type of data to be collected from the first device and the at least one second device includes creating at least one device-capability pair, wherein each device-capability pair includes a capability and at least one of, the first device and the at least one second device interacting over the capability, querying a device capabilities mapping database based on each device-capability pair, wherein the device capabilities mapping database includes a mapping of each of the capabilities with the type of data, and receiving the type of data to be collected for each capability corresponding to the at least one of, the first device and the at least one second device, from the device capabilities mapping database.

In accordance with another aspect of the disclosure, collecting the identified type of data from the first device and the at least one second device in the online mode includes establishing a session with an IoT cloud server, wherein the IoT cloud server collects and stores the data of the first device and the at least one second device, sending a data request to the IoT cloud server indicating the type of data required from the first device and the at least one second device, and receiving the indicated type of data of the first device and the at least one second device from the IoT cloud server.

In accordance with another aspect of the disclosure, collecting the identified type of data from the first device and the at least one second device in the offline mode may include, establishing a session with the first device and the at least one second device using a communication network supported by the electronic device, the first device, and the at least one second device, sending the data request indicating the type of data to the first device and the at least one second device, and receiving the indicated type of data from the first device and the at least one second device, in response to sending the data request.

In accordance with another aspect of the disclosure, determining the correlation between the first device and the at least one second device includes determining a plurality of correlation features based on at least one of, the capabilities of the first device and the at least one second device, and the data collected from the first device and the at least one second device, wherein the plurality of correlation features includes at least one of, an action continuity feature, a conflict resolution feature, a failure resolution feature, and screen intelligence feature, between the first device and the at least one second device.

In accordance with another aspect of the disclosure, determining the action continuity feature between the first device and the at least one second device includes training an action continuity model, based on a labelled dataset of candidate correlated devices, and associated device context and capabilities, and processing the capabilities and the collected data of the first device and the at least one second device, using the trained action continuity model to determine the action continuity feature between the first device and each of the at least one second device.

In accordance with another aspect of the disclosure, the method includes determining an action continuity correlation index for each of the at least one second device with respect to the first device by processing the capabilities and the collected data of the first device (104a) and each second device, using the trained action continuity model, wherein the action continuity correlation index of each second device indicates a probability of continuing at least one action of each of the second device on the first device.

In accordance with another aspect of the disclosure, determining the conflict resolution feature between the first device and the at least one second device includes training a first reinforcement model based on at least one pre-defined conflict policy to detect at least one conflict among operations of the first device and the at least one second device, and processing the data collected from the first device and each of the at least one second device using the trained first reinforcement model to determine the conflict resolution feature between the first device and each of the at least one second device, wherein the conflict resolution feature depicts the at least one conflict among the operations of the first device and each of the at least one second device.

In accordance with another aspect of the disclosure, the method includes determining a conflict correlation index for each second device with respect to the first device by processing the data collected from the first device and each second device using the trained first reinforcement model, wherein the conflict correlation index determined for each second device depicts a conflict probability among operations of the first device and each second device.

In accordance with another aspect of the disclosure, determining the failure resolution feature between the first device and the at least one second device includes training a second reinforcement model based on at least one pre-defined failure policy to detect a failure in the at least one operation of the first device with respect to the current operating context of the at least one second device, and processing the data collected from the first device and each of the at least one second device using the trained second reinforcement model to determine the failure resolution feature between the first device and each of the at least one second device, wherein the failure resolution feature between the first device and each second device depicts that the at least one operation of the first device is expected to fail with respect to the current operating context of each second device.

In accordance with another aspect of the disclosure, the method includes determining a failure resolution correlation index for each second device with respect to the first device by processing the data collected from the first device and each second device using the trained second reinforcement model, wherein the failure resolution correlation index determined for each second device depicts a failure probability in the at least one operation of the first device with respect to the current operating context of each second device.

In accordance with another aspect of the disclosure, recommending the at least one suggestion includes ranking each of the plurality of correlation features based on a correlation index associated with the corresponding correlation feature, wherein the correlation index includes at least one of, the action continuity correlation index, the conflict correlation index, and the failure resolution correlation index, creating at least one semantic action based on at least one of, the ranking of the plurality of correlation features, and the data collected from the first device and the at least one second device, and recommending the created at least one semantic action as the at least one suggestion to control the at least one operation of at least one of, the first device and the at least one second device.

In accordance with another aspect of the disclosure, recommending the at least one suggestion includes rendering the at least one suggestion as a keyboard overlayed content over a control interface of the first device on the electronic device.

In accordance with another aspect of the disclosure, the method includes recommending, by the electronic device, configurations for the first device based on at least one content being rendering on the at least one second device, and recommending, by the electronic device, configurations of the first device for the at least one second device, based on the data collected from the at least one second device and the correlation between the first device and the at least one second device.

In accordance with another aspect of the disclosure, an Ultra-Wideband based method of multi-device interaction in an Internet of Things (IoT) environment is provided. The method includes providing a user interface belonging to a first IoT device on a user device, performing a correlation of operating capabilities of the first IoT device with an operating context of a plurality of second IoT devices operatively connected to the first IoT device, and providing a recommendation on the user interface of the first IoT device, to vary an operation of at least one of, the first IoT device and the second IoT device as a result of the correlation.

In accordance with another aspect of the disclosure, a method of multi-device interaction in an Internet of Things (IoT) environment is provided. The method includes identifying, a first IoT device in the IoT environment in response to a user pointing a user device towards the first IoT device, determining at least one second IoT device contextually related to the first IoT device based on a correlation between device capabilities of the first IoT device and a current operating context of the second IoT device, and recommending to the user of the user device, one or more semantic actions associated with one of the first IoT device and the at least one second IoT device based on the correlation.

In accordance with another aspect of the disclosure, the one or more smart actions may be recommended over a control interface of the first IoT device on the user device.

In accordance with another aspect of the disclosure, the correlation may determine at least one of a conflict resolution, an action continuity, and a failure resolution between the first IoT device and the at least one second IoT device.

In accordance with another aspect of the disclosure, an electronic device for controlling operations of devices in an Internet of Things (IoT) environment is provided. The electronic device includes a memory and at least one processor coupled to the memory. The at least one processor is configured to identify a first device in response to a user pointing the electronic device towards the first device. The at least one is further configured to determine at least one second device contextually related to the first device. The at least one processor is further configured to recommend at least one suggestion to control at least one operation of at least one of, the first device and the at least one second device, based on a correlation between capabilities of the first device and a current operating context of the at least one second device.

In accordance with another aspect of the disclosure, the at least one processor may be configured to identify at least first set of relevant devices for the first device using a capability based device clustering model, identify at least one second set of relevant devices for the first device using a device interaction prediction model, creating a union of the at least one first set of relevant devices and the at least one second set of relevant devices, wherein the created union is a set including at least one device present in either the at least one first set of relevant devices or the at least one second set of relevant devices, and determining the at least one device present either in the first set of relevant devices or the at least one second set of relevant devices as the at least one second device contextually related to the first device.

In accordance with another aspect of the disclosure, the at least one processor may be configured to fetch a list of registered devices in the IoT environment from a device database, wherein the device database includes the list of devices registered by the user on deploying each device in the IoT environment and the associated capabilities, identify the capabilities of the first device and each registered device using the device database, and form a cluster of devices for the first device based on the identified capabilities of the first device and each registered device present in the list of devices, wherein the formed cluster of devices includes the at least first set of relevant devices from the list of devices that has the similar capabilities of the first device.

In accordance with another aspect of the disclosure, the at least one processor may be configured to fetch the list of registered devices from the device database, identify the capabilities of the first device and each registered device using the device database, compute and assign a confidence score for each registered device with respect to the first device, by matching the capabilities of each device with the capabilities of the first device, discard at least one device from the list of registered devices that is associated with the confidence score less than a device interaction threshold, and identify at least one device from the list of registered devices that is associated with the confidence score greater than or equal to the device interaction threshold as the at least one second set of relevant devices for the first device.

In accordance with another aspect of the disclosure, the at least one processor may be configured to identify a type of data to be collected from the first device and the at least one second device, wherein the data of each device corresponds to at least one of, a state, a content, a location, and the current operating context of the corresponding device, collect the identified type of data from the first device and the at least one second device in an online mode or in an offline mode, determine the correlation between the first device and the at least one second device based on the data collected from the first device and the at least one second device and the capabilities of the first device and the at least one second device, and recommend the at least one suggestion to control the at least one operation of at least one of, the first device and the at least one second device based on the determined correlation between the first device and the at least one second device.

In accordance with another aspect of the disclosure, the at least one processor may be configured to create at least one device-capability pair, wherein each device-capability pair includes a capability and at least one of, the first device and the at least one second device interacting over the capability, query a device capabilities mapping database based on each device-capability pair, wherein the device capabilities mapping database includes a mapping of each of the capabilities with the type of data, and receive the type of data to be collected for each capability corresponding to the at least one of, the first device and the at least one second device, from the device capabilities mapping database.

In accordance with another aspect of the disclosure, the at least one processor may be configured to determine a plurality of correlation features based on at least one of, the capabilities of the first device and the at least one second device, and the data collected from the first device and the at least one second device, wherein the plurality of correlation features includes at least one of, an action continuity feature, a conflict resolution feature, a failure resolution feature, and screen intelligence feature, between the first device and the at least one second device.

In accordance with another aspect of the disclosure, the at least one processor may be configured to rank each of the plurality of correlation features based on a correlation index associated with the corresponding correlation feature, wherein the correlation index includes at least one of, the action continuity correlation index, the conflict resolution correlation index, and the failure resolution correlation index, create at least one semantic action based on at least one of, the ranking of the plurality of correlation features, and the data collected from the first device and the at least one second device, and recommend the created at least one semantic action as the at least one suggestion to control the at least one operation of at least one of, the first device and the at least one second device.

In accordance with another aspect of the disclosure, the at least one processor may be configured to render the at least one suggestion as a keyboard overlayed content over a control interface of the first device on the electronic device.

In accordance with another aspect of the disclosure, The at least one processor may be configured to recommend configurations for the first device based on at least one content being rendering on the at least one second device, and recommend configurations of the first device for the at least one second device based on the data collected from the at least one second device and the correlation between the first device and the at least one second device based on the data collected from the at least one second device and the correlation between the first device and the at least one second device.

These and other aspects of the example embodiments herein will be better appreciated and understood when considered in conjunction with the following description and the accompanying drawings. It should be understood, however, that the following descriptions, while indicating example embodiments and numerous specific details thereof, are given by way of illustration and not of limitation. Many changes and modifications may be made within the scope of the example embodiments herein without departing from the spirit thereof, and the example embodiments herein include all such modifications.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 9B is another example diagram depicting a training of a first reinforcement module and using a trained first reinforcement to determine a conflict resolution feature between each contextually related device and a pointed device, according to an embodiment of the disclosure;

FIG. 10B is another example diagram depicting a training of a second reinforcement module and using a trained second reinforcement to determine a failure resolution feature between each contextually related device and a pointed device, according to an embodiment of the disclosure;

Throughout the drawings, like reference numerals will be understood to refer to like parts, components, and structures.

DETAILED DESCRIPTION

Figure 1A:
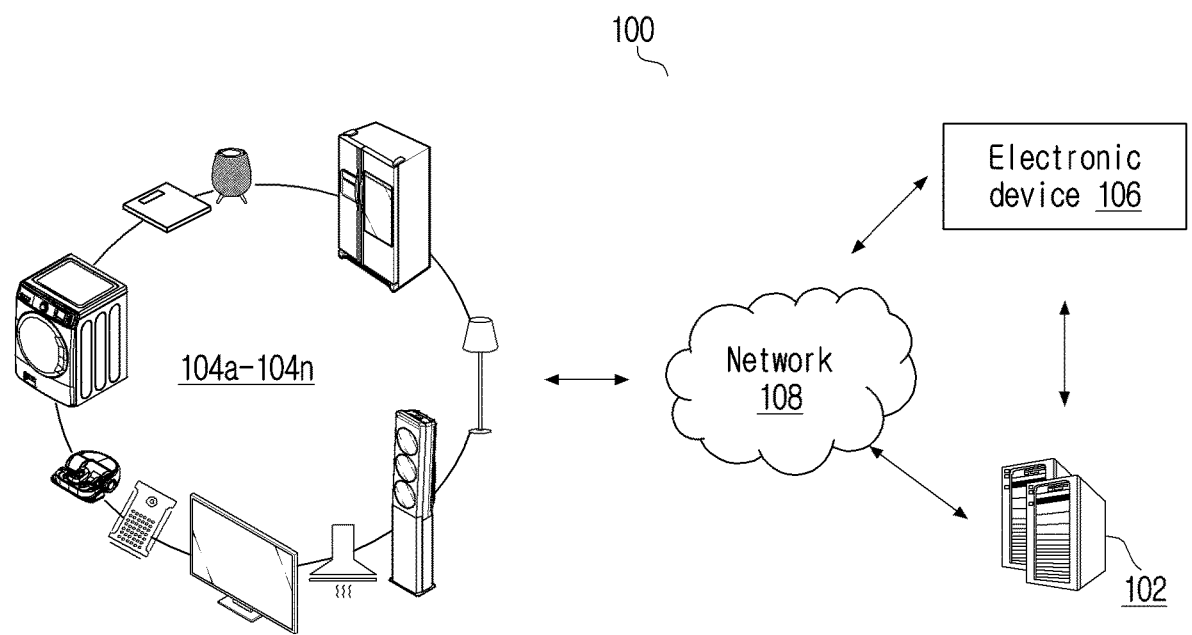
FIG. 1A depicts an Internet of Things (IoT) system, according to an embodiment of the disclosure.

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope spirit of the disclosure. In addition, descriptions of well-known functions and constructions may be omitted for clarity and conciseness.

The terms and words used in the following description and claims are not limited to the bibliographical meanings, but are merely used to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Embodiments herein disclose methods and systems for controlling operations of devices in an Internet of Things (IoT) environment based on a correlation between the devices.

Referring now to the drawings, and more particularly to FIGS. 1A, 1B, 2 to 7, 8A, 8B, 9A, 9B, 10A, 10B, 11, 12, 13A, 13B, 14A, 14B, 15A, 15B, 16A, and 16B, where similar reference characters denote corresponding features consistently throughout the figures, there are shown example embodiments.

Embodiments herein use the terms such as "first device," "pointed device," "user selected device," and so on, interchangeably to refer to a device in an Internet of Things (IoT) environment, which may be pointed by a user for controlling.

Embodiments herein use the terms such as "second devices," "contextually related/relevant devices," "correlated devices," and so on, interchangeably to refer to devices that are dependent on the pointed device and affect operations of the pointed device in the IoT environment.

Embodiments herein use the terms such as "data," "metadata," "context data," and so on, interchangeably to refer to at least one of, a state, a location, device information, manufacturer provided information, a current operating context, and so on of each of a plurality of devices present in the IoT environment.

Embodiments herein use the terms such as "operations," "actions," "tasks," and so on, interchangeably through the document.

Embodiments herein use the terms such as "semantic actions," "recommendations," "suggestions," "notifications," "alerts," and so on, interchangeably through the document.

Figure 1B:
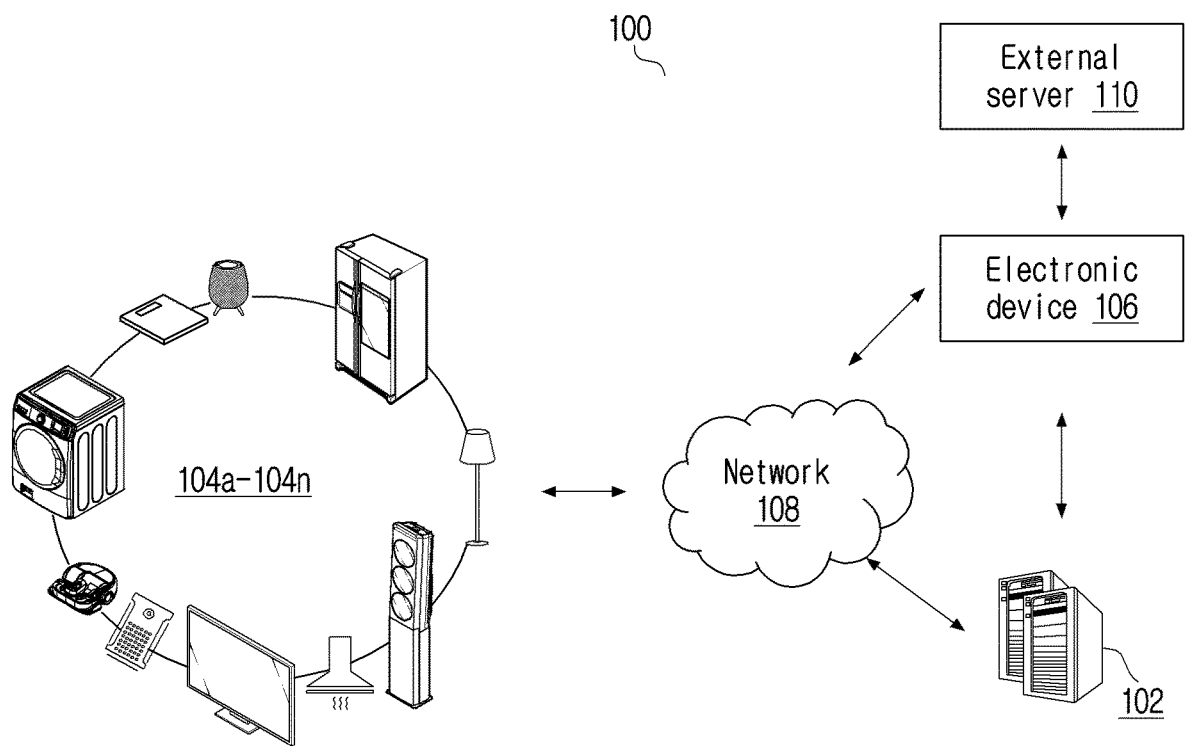
FIG. 1B depicts another Internet of Things (IoT) system, according to an embodiment of the disclosure.

FIGS. 1A and 1B depict Internet of Things (IoT) systems, according to embodiments of the disclosure.

Referring to FIG. 1A, an IoT system 100 includes an IoT cloud server 102, a plurality of devices 104a-104n, and an electronic device 106 according to various embodiments of the disclosure.

The IoT cloud server 102, the plurality of devices 104a-104n, and the electronic device 106 may be connected with each other. In an example, the IoT cloud server 102, the plurality of devices 104a-104n and the electronic device 106 may be connected with each other using a communication network 108. The communication network 108 may include at least one of, but is not limited to, a wired network, a value-added network, a wireless network, a satellite network, or a combination thereof. Examples of the wired network may be, but are not limited to, a Local Area Network (LAN), a Wide Area Network (WAN), an Ethernet, and so on. Examples of the wireless network may be, but are not limited to, a cellular network, a wireless LAN (Wi-Fi), Bluetooth, Bluetooth low energy, Zigbee, Wi-Fi Direct (WFD), Ultra-wideband (UWB), infrared data association (IrDA), near field communication (NFC), and so on. In another example, the electronic device 106, and the plurality of devices 104a-104n may be connected with each other directly (for example, via a direct communication, via an access point, and so on). In another example, the electronic device 106 and the plurality of devices 104a-104n may be connected to the IoT cloud server 102 and the electronic device 106 may be connected to the plurality of devices 104a-104n through the IoT cloud server 102. In another example, the electronic device 106 may be connected to the plurality of devices 104a-104n using the communication network 108 and the electronic device 106 and the plurality of devices 104a-104n may be connected to the IoT cloud server 102 using the communication network 108. In another example, the electronic device 106, the plurality of devices 104a-104n and the IoT cloud server 102 may be connected with each other via a relay, a hub, and a gateway. It is understood that the electronic device 106, the plurality of devices 104a-104n, and the IoT cloud server 102 may be connected to each other in any of various manners (including those described above) and may be connected to each other in two or more of various manners (including those described above) at the same time.

The IoT cloud server 102 referred herein may be a server that obtains, stores, and manages device information mappings, capabilities, manufacturer provided information, and location information of each of the plurality of devices 104a-104n present in an IoT environment. Examples of the IoT environment may be, but are not limited to, a smart home environment, a smart office environment, a smart hospital environment, and so on. The device information may include information such as, but is not limited to, an identification value (for example, device ID information) of each of the plurality of devices 104a-104n, a device type of each of the plurality of devices 104a-104n, and so on. In an example herein, the identification value/device ID information may include information such as, but are not limited to, a Media Access Control (MAC) identifier (MAC ID), a serial number, a unique device ID, and so on. The capability mappings include information about one or more capabilities of each of the plurality of devices 104a-104n. Examples of the capabilities of the device 104a-104n may be, but not limited to, an audio, a video, a display, an energy limit, data sensing capability, and so on. The location information includes information about a location of each of the plurality of devices 104a-104n. The location of the device (104a-104n) may indicate an area or a room (for example, a living room, a kitchen, a bedroom, a study room, a child room, a ward, a conference room, a factory unit, and so on) in the IoT environment, where the device (104a-104n) is present. The manufacturer provided information of the device 104a-104n may include at least one of, but is not limited to, a model of the device 104a-104n, a year of manufacturing of device 104a-104n, a lifespan of the device 104a-104n, and so on. The IoT cloud server 102 may update the device information, the capabilities mappings, and location information of the devices 104a-104n, on adding or removing any of the plurality of devices 104a-104n in the IoT environment.

The IoT cloud server 102 may also obtain and store information such as, but are not limited to, a power on/off state, an operation being performed by each of the plurality of devices 104a-104n, and so on. Examples of the operation may be, but are not limited to, audio casting, video casting, controlling lights, energy managing, purifying air, sensing environmental factors (such as temperature humidity, smoke, or the like), and so on. The IoT cloud server 102 may be configured as a hardware device independent of the electronic device 106 but is not limited thereto. The IoT cloud server 102 may be a component of the electronic device 106 or may be a server designed to be classified into software.

The plurality of devices 104a-104n may be IoT devices capable of exchanging information with each other and other devices (such as, the IoT cloud server 102, the electronic device 106, or the like). Examples of the plurality of devices 104a-104n may be, but are not limited to, a smart phone, a mobile phone, a video phone, a computer, a tablet personal computer (PC), a netbook computer, a laptop, a wearable device, a vehicle infotainment system, a workstation, a server, a personal digital assistant (PDA), a smart plug, a portable multimedia player (PMP), a moving picture experts group (MPEG-1 or MPEG-2) audio layer 3 (MP3) layer, a mobile medical device, a light, a voice assistant device, a camera, a home appliance, one or more sensors, and so on. Examples of the home appliance may be, but are not limited to, a television (TV), a digital video disc (DVD) player, an audio device, a refrigerator, an air conditioner (AC), an air purifier, a chimney, a cooktop, a vacuum cleaner, an oven, a microwave, a washing machine, a dryer, a set-top box, a home automation control panel, a security control panel, a game console, an electronic key, a camcorder, an electronic picture frame, a coffee maker, a toaster oven, a rice cooker, a pressure cooker, and so on. Examples of the sensors may be, but are not limited to, a temperature sensor, a humidity sensor, an infrared sensor, a gyroscope sensor, an atmospheric sensor, a proximity sensor, a red green blue (RGB) sensor (a luminance sensor), a photosensor, a thermostat, an Ultraviolet (UV) light sensor, a dust sensor, a fire detection sensor, a carbon dioxide ($CO_2$) sensor, a smoke sensor, a window contact sensor, a water sensor, or any other equivalent sensor. A function of each sensor may be intuitively inferred by one of ordinary skill in the art based on its name, and thus, its detailed description is omitted.

The plurality of devices 104a-104n may be deployed in various locations or areas or rooms in the IoT environment with which users may interact and control the operations of each device 104a-104n.

The plurality of devices 104a-104n may perform the one or more operations/actions based on their capabilities. Examples of the operations may be, but are not limited to, playing media (audio, video, or the like), capturing the media, purifying the air, performing cooling or heating of a defined area, controlling lights, sensing various environmental factors (for example, temperature, smoke, humidity, or the like), and so on. The plurality of devices 104a-104n may perform the respective one or more actions simultaneously.

The plurality of devices 104a-104n may register with the IoT cloud server 102 by communicating the device information, the capabilities, the manufacturer provided information, and the location information to the IoT cloud server 102 or the electronic device 106, once being deployed in the IoT environment. The user may register the plurality of devices 104a-104n with the IoT cloud server 102 using the electronic device 106.

The plurality of devices 104a-104n may also communicate data/metadata to the IoT cloud server 102 or the electronic device 106 through the communication network 108. The data of each device (104a-104n) corresponds to at least one of, but is not limited to, a state of the device (104a-104n) (i.e., power ON/power OFF of the device 104a-104n), a content being played on the device (104a-104n), a location of the device (104a-104n), device information of the device (104a-104n), manufacturer provided information of the device (104a-104n), a current operating context of the device (104a-104n), and so on. In an example herein, the content may include at least one of, media (such as, an audio, a video, an image, a Graphics Interchange Format (GIF), or the like), text, webpages, and so on. In an example herein, the current operating context of the device (104a-104n) depicts the operation being performed by the device (104a-104n) at a current instance of time, based on its capability.

The electronic device 106 referred herein may be a device used to control the operations of the plurality of devices 104a-104n. The electronic device 106 may be a user device that is being used by the user to connect, and/or interact, and/or control the operations of the plurality of devices 104a-104n. Examples of the electronic device 106 may be, but are not limited to, a smart phone, a mobile phone, a video phone, a computer, a tablet personal computer (PC), a netbook computer, a laptop, a wearable device, a personal digital assistant (PDA), a workstation, a server, an IoT device, or any other device that may be used to connect, and/or interact, and/or control the operations of the plurality of devices 104a-104n.

The electronic device 106 obtains, stores, and maintains the device information, the capabilities mappings, the manufacturer provided information, the location information, or the like of each device (104a-104n) present in the IoT environment by directly communicating with each device (104a-104n) through the communication network 108. Alternatively, the electronic device 106 may obtain the device information, the capabilities mappings, the manufacturer provided information, the location information, or the like of each device 104a-104n from the IoT cloud server 102 through the communication network 108. Also, the electronic device 106 maintains separate databases for storing the device information, the capabilities mappings, the location information, or the like of each device (104a-104n) present in the IoT environment.

Figure 2:
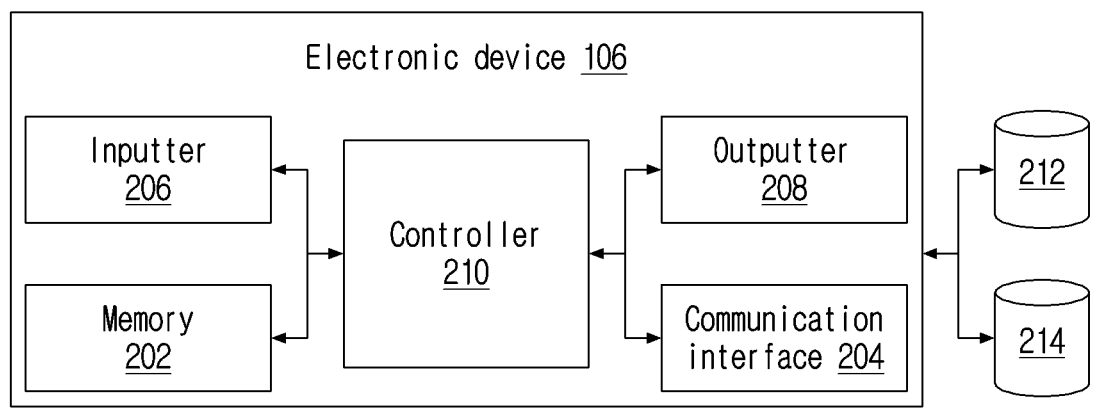
FIG. 2 is a block diagram depicting various components of an electronic device for controlling operations of a plurality of devices, according to an embodiment of the disclosure.

FIG. 2 is a block diagram depicting various components of an electronic device for controlling operations of a plurality of devices, according to an embodiment of the disclosure.

Referring to FIG. 2, in an example herein, the electronic device 106 maintains a device database 212, a device-capabilities mapping database 214, and so on. The device database includes a mapping of the list/plurality of devices 104a-104n (registered with the electronic device 106 or the IoT cloud server 102 on deploying each device in the IoT environment) with the associated capabilities. The device capabilities mapping database includes a mapping of each of the capabilities with the data/type of data. The type of data may be the metadata associated with each device (104a-104n).

The electronic device 106 also obtains, determines, or generates a control command for controlling each of the plurality of devices 104a-104n, by utilizing the device information, the capabilities mappings, the location information, or the like of each device (104a-104n). The electronic device 106 may transmit the control command to any of the devices 104a-104n to perform the operations based on the stored capabilities of the respective devices 104a-104n. The electronic device 106 may receive a result of performing the operations according to the control command from the device (104a-104n) that performed the operation.

In an embodiment, the electronic device 106 may be configured to control the operations of each of the plurality of devices 104a-104n based on a correlation between the plurality of devices 104a-104n.

For controlling the operations of each device (104a-104n), the electronic device 106 identifies a first device (for example, the device 104a) of the plurality of devices 104a-104n pointed for interacting and controlling. In an embodiment, an application deployed on the electronic device 106 may point the first device 104a for interacting and controlling. Examples of the application may be, but are not limited to, a video streaming application, an audio application, a device control-based application, and so on. In another embodiment, the user may use an interactive application deployed on the electronic device 106 to point the first device 104a for interacting and controlling. The interactive application displays a user interface of the one or more devices 104a-104n present in the IoT environment and enables the user to select/point any of the devices 104a-104n. In another embodiment, the user may use Ultra-Wideband (UWB) supported by the electronic device 106 to point the first device 104a for interacting and controlling. In another embodiment, the user may use a short-range communication supported by the electronic device 106 to point the first device 104a for interacting and controlling its operations. Examples of the short-range communication may be, but are not limited to, Bluetooth, Bluetooth Low Energy (BLE), Wi-Fi, Infrared wireless communication, Near Field Communication (NFC), Zigbee, Worldwide Interoperability for Microwave Access (WiMAX) or any other IEEE 802.15.4 compliant protocols. In another example, the user may point the first device 104a using any other communication methods supported by the communication network 108.

Upon identifying the first device 104a, the electronic device 106 checks if there are any other devices present in the IoT environment. If there are no devices present, the electronic device 106 provides normal controls to control the operations of the first device 104a. Examples of the normal controls may be, but are not limited to, a turn ON/OFF command, setting of the first device 104a, and so on.

If there are plurality of devices 104a-104n present in the IoT environment, the electronic device 106 determines one or more second devices (for example, the one or more devices 104b-104n) of the plurality of devices 104a-104n for the first device 104a. The one or more second devices 104b-104n may be contextually related devices or devices contextually related to the first device 104a. In an example herein, the contextually related devices may refer to devices that have similar capabilities of the first device 104a. For determining the one or more second devices 104b-104n, the electronic device 106 identifies a first set of relevant devices and a second set of relevant devices for the first device 104a. The first set of relevant devices and the second set of relevant devices may be devices from the plurality of devices 104a-104n that have the capabilities matching with the capabilities of the first device 104a.

For identifying the first set of relevant devices, the electronic device 106 fetches the plurality/list of devices/list of registered devices 104a-104n for the first device 104a from the device database 212. The electronic device 106 identifies the capabilities of the first device 104a and each device present in the list of devices 104a-104n using the device database.

Figure 3:
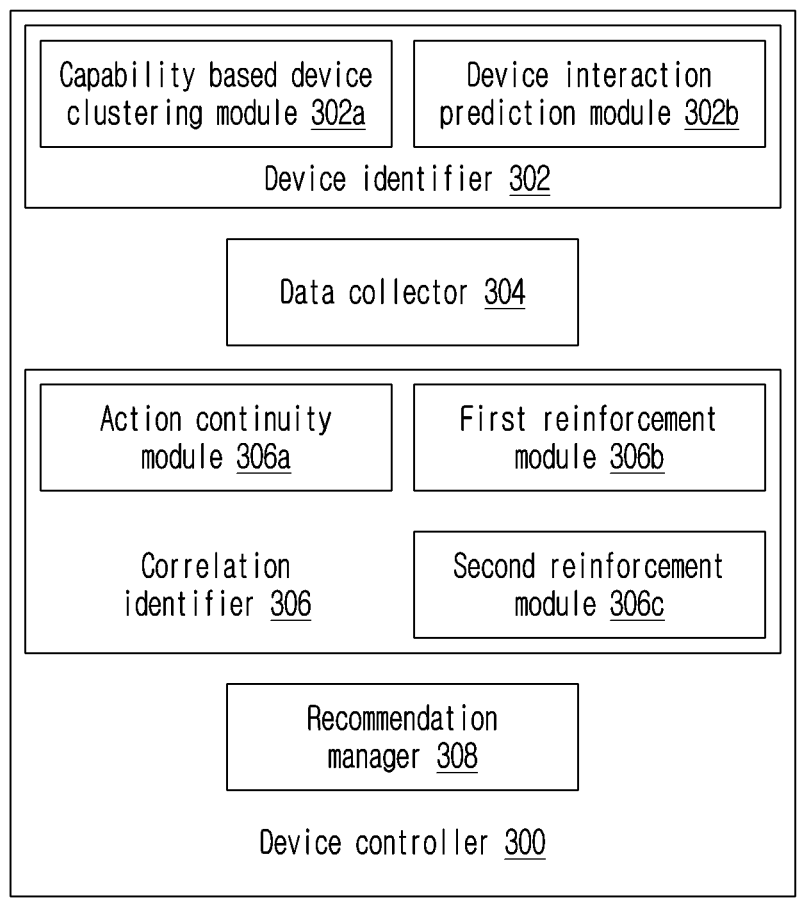
FIG. 3 depicts a device controller in an electronic device for controlling the operations of a plurality of devices, according to an embodiment of the disclosure.

FIG. 3 depicts a device controller in an electronic device for controlling operations of a plurality of devices, according to an embodiment of the disclosure.

Referring to FIG. 3, the electronic device 106 uses a capability-based device clustering module/model 302a to form a cluster of devices for the first device 104a based on the identified capabilities of the first device 104a and each device present in the list of devices 104a-104n. The formed cluster of devices may be the first set of relevant devices from the list of devices 104a-104n for the first device 104a, which have the similar capabilities of the first device 104a. The capability-based device clustering module/model 302a is described in detail in conjunction with FIG. 3.

For identifying the second set of relevant devices, the electronic device 106 fetches the list of devices 104a-104n for the first device 104a from the device database 212. The electronic deice 106 identifies the capabilities of the first device 104a and each device present in the list of devices 104a-104n using the device database 212. The electronic device 106 computes and assigns a confidence score for each device present in the list of devices 104a-104n with respect to the first device 104 using a device interaction prediction module/model 302b. The electronic device 106 may use the device interaction prediction module 302b to compute the confidence score for each device by matching the capabilities of the respective device with the capabilities of the first device 104a. The confidence score of each device may depict a confidence of possible interactions between the corresponding device and the first device 104a. On assigning the confidence score for each device, the electronic device 106 discards the one or more devices from the fetched list of devices 104a-104n that have been associated with the confidence score less than a device interaction threshold. The electronic device 106 identifies a set of devices from the list of devices 104a-104n, wherein each device in the set of devices has been associated with the confidence score greater than or equal to the device interaction threshold. The electronic device 106 determines the set of devices associated with the confidence score greater than or equal to the device interaction threshold as the second set of relevant devices for the first device 104a. The device interaction threshold may be set statistically based on a model confidence score. In an example, the device interaction threshold may be set as 90%. In such a scenario, the devices that may have the confidence score greater than or equal to 90% are considered as the devices that may interact with the first device 104a. The device interaction prediction module/model 302b is described in detail in conjunction with FIG. 3.

On determining the first and second set of relevant devices, the electronic device 106 creates a union of the first set of relevant devices and the second set of relevant devices to determine the one or more second devices 104b-104n that are contextually related to the first device 104a. The created union is a set including all the devices present in either the first set of relevant devices or the second set of relevant devices. The electronic device 106 selects the devices present in either the first set of relevant devices or the second set of relevant devices as the one or more second devices 104b-104n for the first device 104a.

On determining the one or more second devices 104b-104n for the first device 104a, the electronic device 106 identifies a type of data to be collected from the first device 104a and the one or more second devices 104b-104n. In an example, the type of the data includes at least one of, but is not limited to, the state of the device, the content being played on the device, the device information, the manufacturer provided information, the location of the device, the current operating context of the device, and so on. For identifying the type of data to be collected from the first device 104a and the one or more second devices 104b-104n, the electronic device 106 creates one or more device-capability pairs. Each device-capability pair includes the capability and at least one of, the first device 104a and the one or more second devices 104b-104n interacting over the corresponding capability. The electronic device 106 accesses the mapping of each of the capabilities with the type of data by querying the device capabilities mapping database. The electronic device 106 uses the mapping of each of the capabilities with the type of data to determine the type of data for each of the capability present in the created one or more device-capability pairs. The electronic device 106 associates the type of data determined for each capability with the respective at least one of the first device 104a and the one or more second devices 104b-104n.

The electronic device 106 collects the identified type of data from the first device 104a and the one or more second devices 104b-104n.

In an embodiment, the electronic device 106 collects the identified type of data from the first device 104a and the one or more second devices 104b-104n in an online mode. In the online mode, the electronic device 106 establishes a session with the IoT cloud server 102 through the communication network 108. On establishing the session with the IoT cloud server 102, the electronic device 106 sends a data request to the IoT cloud server 102 indicating the type of data to be collected from the first device 104a and the one or more second devices 104b-104n. The IoT cloud server 102 collects the indicated type of data from the first device 104a and the one or more second devices 104b-104n through the communication network 108. The IoT cloud server 102 forwards the collected type of data from the first device 104a and the second devices 104b-104n to the electronic device 106 through the communication network 108.

In another embodiment, the electronic device 106 collects the identified type of data from the first device 104a and the one or more second devices 104b-104n in an offline mode. In the offline mode, the electronic device 106 establishes a session with the first device 104a and the one or more second devices 104b-104n using the communication network 108 supported by the electronic device 106, the first device 104a and the one or more second devices 104b-104n. The electronic device 106 sends the data request indicating the type of data to the first device 104a and the one or more second devices 104b-104n. The electronic device 106 receives the indicated type of data from the first device 104a and the one or more second devices 104b-104n through the session established over the communication network 108.

Upon collecting the data from the first device 104a and the one or more second devices 104b-104n, the electronic device 106 determines the correlation between the first device 104a and each of the one or more second devices 104b-104n based on the data collected from the first device 104a and the one or more second devices 104b-104n and/or the capabilities of the first device 104a and the one or more second devices 104b-104n. In an embodiment, the determined correlation between the first device 104a and each of the one or more second devices 104b-104n may correspond to a plurality of correlation features with a plurality of correlation indices. Examples of the correlation features with the correlation indices may be, but are not limited to, an action continuity feature with an action continuity correlation index, a conflict resolution feature with a conflict resolution correlation index, a failure resolution feature with a failure resolution correlation index, a screen intelligence feature with a screen intelligence correlation index, a setting suggestion feature with a setting suggestion correlation index, and so on. For the ease of description and better understanding of the embodiments, the action continuity feature, the conflict resolution feature, the failure resolution feature, the screen intelligence feature, and the setting suggestion feature may be considered as examples of the correlation features, but it may be obvious to a person skilled in the art any other correlation features may be considered.

The action continuity feature between the first device 104a and each second device (104b-104n) may depict a correlation among the first device 104a and each second device (104b-104n) in continuing the one or more operations/actions of each second device (104b-104n) on the first device 104a or vice versa. The action continuity correlation index of each second device (104b-104n) with respect to the first device 104a depicts a probability of continuing the one or more operations of each second device (104b-104n) on the first device 104a or vice versa. The conflict resolution feature between the first device 104a and each second device (104b-104n) may depict a correlation among the operations of the first device 104a and each second device (104b-104n) that may conflict with each other. The conflict resolution correlation index of each second device (104b-104n) with respect to the first device 104a may depict a probability of the conflict among the operations of the first device 104a and each second device (104b-104n). The failure resolution feature between the first device 104a and each second device (104b-104n) depicts that one or more operations of the first device 104a may be expected to fail with respect to the current operating context of each second device (104b-104n). The failure resolution correlation index of each second device (104b-104n) with respect to the first device 104a may depict a probability of failure in the one or more operations of the first device 104a due to the one or more operations of each second device (104b-104n). The setting suggestion feature between the first device 104a and each second device (104b-104n) depicts a correlation among the first device 104a and each second device (104b-104n) in suggesting one or more settings/configurations of each second device (104b-104n) on the first device 104a or vice versa. Examples of the settings/configurations may be, but are not limited to, brighter/dimmer settings, theme settings, display settings, audio settings, and so on. The setting suggestion correlation index of each second device (104b-104n) with respect to the first device 104a may depict a probability of suggesting the settings of each second device (104b-104n) on the first device 104a or vice-versa. The screen intelligence feature between the first device 104a and each second device (104b-104n) depicts the correlation between the content being played in the first device 104a and each second device (104b-104n) and associated metadata.

Embodiments herein explain determination of the action continuity feature, the conflict resolution feature, and the failure resolution feature, using methods, but it may be obvious to a person skilled in the art that similar methods may be used to determine the other correlation features.

For determining the action continuity feature between the first device 104a and each second device (104b-104n), the electronic device 106 trains an action continuity module/model 306a to determine the action continuity feature. The electronic device 106 uses Softmax regression to train the action continuity module 306a based on an action training/labelled dataset of candidate correlated devices and associated device context and capabilities. The action training dataset may provide information about the contextually related devices, which have been determined previously while controlling the operations of one or more of the plurality of devices 104b-104n. The electronic device 106 uses the trained action continuity module 306a to process the capabilities of the first device 104a and each second device (104b-104n), and the data collected from the first device 104a and each second device (104b-104n) and determines the action continuity feature between the first device 104a and each second device (104b-104n) by computing the action continuity correlation index for each second device (104b-104n) with respect to the first device 104a. Determining the action continuity feature between the first device 104a and the one or more second devices 104b-104n using the action continuity module 306a is described in detail in conjunction with FIG. 3.

For determining the conflict resolution feature between the first device 104b and each second device (104b-104n), the electronic device 106 trains a first reinforcement module/model 306b based on one or more conflict policies. The one or more conflict policies may be policies that depict the conflict among the operations of the first device 104a and the one or more second devices 104b-104n. The conflict policies may be defined and dynamically varied based on conflict information, which have been monitored while controlling the operations of one or more of the plurality of devices 104a-104n over a time. The conflict information depicts the one or more conflicts which have been occurred in the one or more operations of the contextual related devices. In an example, the user sets the energy consumption set in a smart plug (an example of the device (104a-104n) to a near limit set by user and the user tries to switch on the device connected to the smart plug, which may be identified as a defined conflict rule that result in a conflict (i.e., may exceed energy limit set in the smart plug when the device is switched ON) The electronic device 106 uses the trained first reinforcement module 306b to process the data collected from the first device 104a and each second device (104b-104n) and determines the conflict resolution feature between the first device 104a and each second device (104b-104n) by computing the conflict resolution correlation index for each second device 104b-104n with respect to the first device 104a. Determining the conflict resolution feature between the first device 104a and the one or more second devices 104b-104n using the first reinforcement module 306b is described in detail in conjunction with FIG. 3.

For determining the failure resolution feature between the first device 104a and each second device (104b-104n), the electronic device 106 trains a second reinforcement module/model 306c based on one or more pre-defined failure policies. The failure policy may be a policy defined and dynamically varied for detecting the failure in the operation of one of the contextually related devices with respect to the current operating context of the other devices. The failure policies may be pre-defined based on failure information, which have been monitored while controlling the operations of one or more of the plurality of devices 104a-104n over a time. The failure information depicts the failure in an operation of one of the contextual related devices due to the one or more operations or context of the other contextual related devices. The electronic device 106 uses the trained second reinforcement module 306c to process the data collected from the first device 104a and each second device (104b-104n) and determines the failure resolution feature between the first device 104a and each second device (104b-104n) by computing the failure resolution correlation index for each second device (104b-104n) with respect to the first device 104a. Determining the failure resolution feature between the first device 104a and the one or more second devices 104b-104n using the second reinforcement module 306c is described in detail in conjunction with FIG. 3.

On determining the correlation features between the first device 104a and each of the one or more second devices 104b-104n, the electronic device 106 discards the one or more correlation features between the first device 104a and each second device (104b-104n), which have been associated with the correlation index lesser than a correlation threshold. The correlation threshold may be predefined as a percentage of confidence of the respective modules (306a-306c) that predict the correlation features. Also, the user may define the correlation threshold. In an example, the correlation threshold may set as 90%. In an example herein, the correlation threshold may vary for the action continuity correlation index, the conflict resolution correlation index, the failure resolution correlation index, and so on. The electronic device 106 ranks remaining each of the correlation features between the first device 104a and each second device (104b-104n), based on the correlation indices associated with the corresponding correlation features. In an example, the electronic device 106 ranks the correlation features based on a decreasing order of the associated correlation index. For example, consider that the electronic device 106 computes the action continuity correlation index between the first device 104a and a device A and a device B of the second devices 104b-104b as 95%, and 80% respectively, and the conflict resolution correlation index between the first device 104a and the device B as 92%. In such a scenario, the electronic device 106 ranks the action continuity between the first device 104a and the device A as 1, and the conflict resolution feature between the first device 104a and the device B as 2. The electronic device 106 may discard the action continuity feature between the first device 104a and the device B, as the associated correlation index is less than the correlation threshold (for example, 90%).

The electronic device 106 creates one or more semantic actions, based on at least one of, but is not limited to, the ranking of the correlation features between the first device 104a and each second device (104b-104n), the data collected from the first device 104a, and each second device (104b-104n), and so on. The semantic actions may be recommendations or suggestions or notifications or alerts for controlling the operations of the first device 104a and/or the one or more second devices 104b-104n. The semantic actions may include at least one of, but is not limited to, a suggestion for continuing the operations of the one or more second devices (104b-104n) on the first device 104a or vice versa, a conflict notification, a failure notification, an energy consumption limit notification, a setting suggestion, and so on. The conflict notification indicates the conflict among the operations of the first device 104a and the one or more second devices 104b-104n. The failure notification indicates the expectation of failure in the operation of the first device 104a due to the operations of the one or more second devices 104b-104n, or vice-versa. The energy consumption limit notification indicates consumption of energy by the first device 104a and/or the one or more second devices 104b-104n. The setting suggestion indicates the various settings/configurations of the one or more second devices 104b-104n for the first device 104a or vice-versa. It is understood that any other semantic actions related to the operations of the first device 104a and/or the one or more second devices 104b-104n (including the above) may be considered.

The electronic device 106 recommends the one or more semantic actions to control the operations of the first device 104a and/or the second devices 104b-104n. In an embodiment, the electronic device 106 recommends the one or more semantic actions by rendering the one or more semantic actions as a keyboard overlayed content over a control interface of the first device 104a on an outputter 208 of the electronic device 106. In an example the keyboard overlayed content may include at least one of, an icon, an audio, a video, an image, an emotion, a GIF, text, a symbol, and so on.

The electronic device 106 also receives an input from the user, on recommending the one or more semantic actions to the user. In an example herein, the input may be selecting the one or more semantic actions to control the operations of the first device 104a and/or the one or more second devices 104b-104n. In another example herein, the input may include instructions to the electronic device 106 for controlling the operations of the first device 104a and/or the one or more second devices 104b-104n, based on the recommended one or more semantic actions. The electronic device 106 controls the operations of the first device 104a and/or the one or more second devices 104b-104n, based on the input received from the user. In an example, the electronic device 106 controls the operations of the first device 104a and/or the one or more second devices 104b-104n by performing the one or more semantic actions selected by the user. In another example, the electronic device 106 controls the operations of the first device 104a and/or the one or more second devices 104b-104n based on the instructions received from the user.

Alternatively, the electronic device 106 automatically controls the operations of the first device 104a and/or the one or more second devices 104b-104n by performing the recommended one or more semantic actions.

The electronic device 106 may also be configured to recommend the configurations/settings for the first device 104a based on the one or more contents being rendered on the one or more second devices 104b-104n.

The electronic device 106 may also be configured to recommend the configurations/settings of the first device 104a for the one or more second devices 104b-104n, based on the data collected from the one or more second devices 104a-104n and the correlation between the first device 104a and the one or more second devices 104b-104n.

Referring again to FIG. 1B, the electronic device 106 may communicate information about the first device 104a pointed to interact and control its operations to an external server 110 or the IoT cloud server 102. In an example, the external server 110 may be a server deployed in the IoT environment. In another example, the external server 110 may be remotely located from the electronic device 106 or the IoT cloud server 102. The external server 110 may be configured as a hardware device independent of the IoT cloud server 102 but is not limited thereto. The external server 110 may be a standalone server or may be a server designed to be classified into software.

The external server 110 or the IoT cloud server 102 may be configured to recommend the one or more semantic actions as suggestions to control the operations of the first device 104a and/or the one or more second devices 104b-104n by performing operations performed by the electronic device 106 (as described above), and thus a repeated description thereof is omitted for conciseness.

FIGS. 1A and 1B show blocks of the IoT system 100, but it is to be understood that other embodiments are not limited thereon. In other embodiments, the IoT system 100 may include a greater or lesser number of blocks. Further, the labels or names of the blocks are used only for illustrative purpose and does not limit the scope of the embodiments herein. One or more blocks can be combined together to perform same or substantially similar function in the IoT system 100.

Referring again to FIG. 2, the electronic device 106 includes a memory 202, a communication interface 204, an inputter 206, an outputter 208, and a controller/processor 210. The electronic device 106 may also be coupled with the device database 212, the device capabilities mapping database 214, and so on. The device database 212 includes a mapping of the list/plurality of devices 104a-104n with the associated capabilities. The device capabilities mapping database 214 includes a mapping of each of the capabilities with the data/type of data. The type of data may be the metadata associated with each device (104a-104n).

The memory 202 may store at least one of, but is not limited to, the one or more applications, the interactive application configured to point/select one of the plurality of devices 104a-104b for controlling, the device information, the capabilities, the manufacturer provided information, and the location information of the plurality of devices 104a-104n, the correlation features determined between the devices 104a-104n, the semantic actions recommended for controlling the operations of any of the devices 104a-104n, the inputs received from the user in response to the recommended semantic actions, and so on. The memory 202 may also store a device controller 300, which may be executed by the controller 210 to control the operations of the plurality of devices 104a-104n. The memory 202 referred herein may include at least one type of storage medium, from among a flash memory type storage medium, a hard disk type storage medium, a multi-media card micro type storage medium, a card type memory (for example, an SD or an XD memory), random-access memory (RAM), static RAM (SRAM), read-only memory (ROM), electrically erasable programmable ROM (EEPROM), programmable ROM (PROM), a magnetic memory, a magnetic disk, or an optical disk.

The communication interface 204 may include one or more components which enables the electronic device 106 to communicate with another device (for example, another electronic device, the IoT cloud server 102, the plurality of devices 104a-104n, the external server 110, and so on) using the communication methods that have been supported by the communication network 108. The communication interface 204 may include the components such as, a wired communicator, a short-range communicator, a mobile/wireless communicator, and a broadcasting receiver.

The wired communicator may enable the electronic device 106 to communicate with the other devices using the communication methods such as, but are not limited to, wired LAN, the Ethernet, and so on. The short-range communicator may enable the electronic device 106 to communicate with the other devices using the communication methods such as, but are not limited to, Bluetooth low energy (BLE), near field communicator (NFC), WLAN (or Wi-fi), Zigbee, infrared data association (IrDA), Wi-Fi direct (WFD), UWB communication, Ant+ (interoperable wireless transfer capability) communication, shared wireless access protocol (SWAP), wireless broadband internet (Wibro), wireless gigabit alliance (WiGiG), and so on. In an embodiment, the electronic device 106 may obtain the location information/position information of the electronic device 106 through the short-range wireless communicator. In an example, the electronic device 106 may determine a location/place, where the electronic device 106 is located through an NFC tag. In another example, the electronic device 106 may determine a location/place, where the electronic device 106 is located through an identifier of Wi-Fi. In another example, the electronic device 106 may determine the place/location, where the electronic device 106 is located by confirming a service set identifier (SSID) of the Wi-Fi to which the electronic device 106 has been connected. The mobile communicator may transceiver wireless signals with at least one of a base station, an external terminal, or a server on a mobile communication network/cellular network. In an example, the wireless signal may include a speech call signal, a video telephone call signal, or various types of data, according to transceiving of text/multimedia messages. The broadcasting receiver may receive a broadcasting signal and/or broadcasting-related information from the outside through broadcasting channels. The broadcasting channels may include satellite channels and ground wave channels. In an embodiment, the electronic device 106 may or may not include the broadcasting receiver.

The inputter 206 may be configured to receive interactive inputs from the user. The interactive inputs may be used to identify the first device/any of the devices 104a-104n selected by the user for controlling. The interactive inputs may include selection/pointing of any of the plurality of devices 104a-104n for controlling using the UWB or any other communication methods supported by the electronic device 106. The inputter 206 may also be configured to receive the inputs from the user for controlling the operations of the contextually related devices 104a-104n. The inputs may include at least one of, selecting the one or more semantic actions, providing instructions to control the operations of the contextually related devices 104a-104n based on the semantic actions, and so on.

The outputter 208 may be configured to provide the semantic actions as the recommendations to control the operations of the contextual related devices 104a-104n. The outputter 208 may include at least one of, for example, but is not limited to, a sound outputter/voice assistant module, a display, a vibration motor, a User Interface (UI) module, a light emitting device, and so on, to provide the recommendations to the user. The UI module may provide a specialized UI or graphics user interface (GUI), or the like, synchronized to the electronic device 106, according to the applications.

The outputter 208 receives the one or more semantic actions as the recommendations from the controller 210 and provides the recommendations to the user for controlling the operations of the contextual related devices 104a-104n. The outputter 208 may provide the one or more semantic actions as the keyboard overlayed content on the electronic device 106. On receiving the semantic actions, the outputter 208 generates the keyboard overlayed content for each semantic action using suitable methods and provides the generated keyboard overlayed content on the electronic device 106. The keyboard overlayed content may be generated in a form of, an audio, a video, an emotion, an image, a button, graphics, text, icons, symbols, vibration signals, and so on.

The controller 210 may include one or a plurality of processors. The one or a plurality of processors may be a general-purpose processor, such as a central processing unit (CPU), an application processor (AP), or the like, a graphics-only processing unit such as a graphics processing unit (GPU), a visual processing unit (VPU), and/or an Artificial Intelligence (AI)-dedicated processor such as a neural processing unit (NPU).

The controller 210 may be configured to control the operations of the plurality of devices 104a-104n deployed in the IoT environment. For controlling the operations of the devices 104a-104n, the controller 210 identifies the first device 104a pointed for controlling on receiving the interactive inputs of the user from the inputter 206. The controller 210 determines the one or more second devices 104a-104n contextually related to the first device 104a. The one or more second devices 104a-104n may have the similar capabilities of the first device 104a. The controller 210 recommends the one or more semantic actions as the suggestions to control the operations of the first device 104a and/or the one or more second devices 104b-104n.

The controller 210 processes the device controller 300 to control the operations of the first device 104a and/or the one or more second devices 104a-104n.

Referring again to FIG. 3, the device controller 300 includes a device identifier 302, a data collector 304, a correlation identifier 306, and a recommendation manager 308. The device identifier 302 includes the capability-based device clustering module 302a, and the device interaction prediction module 302b. The correlation identifier 306 includes the action continuity module 306a, the first reinforcement module 306b, and the second reinforcement module 306c.

In an embodiment, the device interaction prediction module 302b, the action continuity module 306a, the first reinforcement module 306b, and the second reinforcement module 306c may be neural networks comprising of a plurality of layers. Each layer has a plurality of weight values and performs a layer operation through calculation of a previous layer and an operation of a plurality of weights/coefficients. Examples of the neural networks include at least one of, but is not limited to, a convolutional neural network (CNN), a deep neural network (DNN), a recurrent neural network (RNN), a restricted Boltzmann Machine (RBM), a deep belief network (DBN), a bidirectional recurrent deep neural network (BRDNN), generative adversarial networks (GAN), a regression based neural network, a deep reinforcement model (with rectified linear unit (ReLU) activation), a deep Q-network, and so on. The device interaction prediction module 302b, the action continuity module 306a, the first reinforcement module 306b, and the second reinforcement module 306c may include a plurality of nodes, which may be arranged in the layers. Examples of the layers may be, but are not limited to, a convolutional layer, an activation layer, an average pool layer, a max pool layer, a concatenated layer, a dropout layer, a fully connected layer, a SoftMax layer, and so on. A topology of the layers of the device interaction prediction module 302b, the action continuity module 306a, the first reinforcement module 306b, and the second reinforcement module 306c may vary based on the type of the device interaction prediction module 302b, the action continuity module 306a, the first reinforcement module 306b, and the second reinforcement module 306c. In an example, the device interaction prediction module 302b, the action continuity module 306a, the first reinforcement module 306b, and the second reinforcement module 306c may include an input layer, an output layer, and a hidden layer. The input layer receives a layer input (which depends on a type of module 302a, 302b, 306a, 306b, and 306c) and forwards the received layer input to the hidden layer. The hidden layer transforms the layer input received from the input layer into a representation, which can be used for generating the output in the output layer. The hidden layers extract useful/low level features from the input, introduce non-linearity in the network and reduce a feature dimension to make the features equivariant to scale and translation. The nodes of the layers may be fully connected via edges to the nodes in adjacent layers. The input received at the nodes of the input layer may be propagated to the nodes of the output layer via an activation function that calculates the states of the nodes of each successive layer in the network based on coefficients/weights respectively associated with each of the edges connecting the layers.

The device interaction prediction module 302b, the action continuity module 306a, the first reinforcement module 306b, and the second reinforcement module 306c may be trained using at least one learning method to determine the contextually related devices, the action continuity feature between the contextually related devices, the conflict resolution feature between the contextually related devices, and the failure resolution between the contextually related devices, respectively. Examples of the learning method may be, but are not limited to, supervised learning, unsupervised learning, semi-supervised learning, reinforcement learning, regression-based learning, and so on. A function associated with the learning method may be performed through the non-volatile memory, the volatile memory, and the controller 210. The controller 210 may include one or a plurality of processors. At this time, one or a plurality of processors may be a general-purpose processor, such as a CPU, an AP, or the like, a graphics-only processing unit such as a GPU, a VPU, and/or an AI-dedicated processor such as an NPU.

The one or a plurality of processors determine the contextually related devices, the action continuity feature between the contextually related devices, the conflict resolution feature between the contextually related devices, and the failure resolution between the contextually related devices in accordance with a predefined operating rule of the device interaction prediction module 302b, the action continuity module 306a, the first reinforcement module 306b, and the second reinforcement module 306c, respectively, stored in the non-volatile memory and the volatile memory. The predefined operating rules of the device interaction prediction module 302b, the action continuity module 306a, the first reinforcement module 306b, and the second reinforcement module 306c are provided through training the modules (302a, 302b, 306a, 306b, and 306c) using the learning method.

Here, being provided through learning means that, by applying the learning method to a plurality of learning data (for example, an interaction training dataset, the action training dataset, a conflict training dataset, a failure training dataset, or the like), a predefined operating rule or AI model of a desired characteristic is made. Determination of the contextually related devices, the action continuity feature between the contextually related devices, the conflict resolution feature between the contextually related devices, and the failure resolution between the contextually related devices may be performed in the electronic device 106 itself in which the learning according to an embodiment is performed, and/or may be implemented through a separate server/system.

The device identifier 302 may be configured to identify the first device 104a pointed for controlling. The device identifier 302 identifies the first device 104 on receiving the interactive inputs of the user from the inputter 206. The device identifier 302 may also be configured to determine the one or more second devices 104b-104n that are contextually related to the first device 104a.

For determining the one or more second devices 104b-104n, the device identifier 302 identifies the first set of relevant devices using the capability-based device clustering module 302a. For identifying the first set of relevant devices, the capability-based device clustering module 302a fetches the list of devices 104a-104n registered with the IoT cloud server 102 or the electronic device 106 and the associated capabilities from the device database 212. The device clustering module 302a determines the capabilities of the first device 104a and each device present in the list of devices 104a-104n by accessing the device database 212. The capability-based device clustering module 302a forms the cluster of devices by including the set of devices from the list of devices 104a-104n, which have the similar capabilities of the first device 104a. The set of devices includes in the formed cluster of devices corresponds to the first set of relevant devices for the first device 104a.

The device identifier 302 identifies the second set of relevant devices for the first device 104a using the device interaction prediction module 302b. The device interaction prediction module 302b may a trained model, which may be used to identify the second set of relevant devices for the first device 104a. The device identifier 302 may train the device prediction module 302b based on an interaction training dataset, which includes the mapping of the plurality of devices 104a-104n with the capabilities. In an example, the device identifier 302 may fetch the interaction training dataset stored in the memory 202. In another example, the device identifier 302 may fetch the interaction training dataset from the IoT cloud server 102 or the external server.

For identifying the second set of relevant devices, the device interaction prediction module 302b fetches the list of devices 104a-104n registered with the IoT cloud server 102 or the electronic device 106 and the associated capabilities from the device database 212. The device interaction prediction module 302b determines the capabilities of the first device 104a and each device present in the list of devices 104a-104n by accessing the device database 212. The device interaction prediction module 302b assigns the confidence score for each of the list of devices with respect to the first device 104a, based on their capabilities. The device interaction prediction module 302b compares the confidence score of each device with respect to the first device 104a with the interaction threshold. The device interaction prediction module 302b discards the set of devices associated with the confidence score of lesser than the interaction threshold. The device interaction prediction module 302b identifies the set of devices associated with the confidence score of equal to greater than the interaction threshold as the second set of relevant devices for the first device 104a.

Once the first and second set of relevant devices have been identified for the first device 104a, the device identifier 302 performs the union of the first and second set of relevant devices. The device identifier 302 determines the one or more devices found in either the first set of relevant devices or the second set of relevant devices as the one or more second devices 104b-104n for the first device 104a. The device identifier 302 provides information about the first device 104a and the one or more second devices 104b-104n to the data collector 304. The device identifier 302 also provides the capabilities of the first device 104a and the one or more second devices 104b-104n to the correlation identifier 306.

The data collector 304 may be configured to identify the type of data to be collected from the first device 104a and the one or more second devices 104b-104n and collect the identified type of data from the first device 104a and the one or more second devices 104b-104n. For identifying the type of data to be collected from the first device 104a and the one or more second devices 104b-104n, the data collector 304 creates the one or more device-capabilities pair. The data collector 304 queries the device capabilities mapping database 214 based on each device-capability pair. The data collector 304 receives the type of data to be collected for each capability from the device capabilities mapping database 214. The data collector 304 associates the type of data identified for each capability with the respective first device 104a and/or the one or more second devices 104b-104n. The data collector 304 collects the identified type of data from the first device 104a and the one or more second devices 104b-104n. In an example, the data collector 304 collects the identified type of data from the first device 104a and the one or more second devices 104b-104n in the online mode. In another example, the data collector 304 collects the identified type of data from the first device 104a and the one or more second devices 104b-104n in the offline mode. The data collector 304 provides the type of data collected from the first device 104a and the one or more second devices 104b-104n to the correlation identifier 306.

The correlation identifier 306 may be configured to determine the correlation features with the correlation indices between the first device 104a and each of the one or more second devices 104b-104n, based on the capabilities and type of data collected from the first device 104a and the one or more second devices 104b-104n. The correlation features include at least one of, but is not limited to, the action continuity feature, the conflict resolution feature, and the failure resolution feature. The correlation indices include at least one of, but is not limited to, the action continuity correlation index associated with the action continuity feature, the conflict resolution correlation index associated with the conflict resolution feature, the failure resolution correlation index associated with the failure resolution feature, and so on.

The correlation identifier 306 trains the action continuity module 306a and uses the trained action continuity module 306a to determine the action continuity feature between the first device 104a and each of the one or more second devices 104b-104n. The correlation identifier 306 uses the Software regression to train the action continuity module 306a using the labelled dataset of candidate devices and the associated capabilities. The action continuity module 306a may be a trained neural network in which a number of layers, a sequence for processing the layers and parameters related to each layer may be known and fixed for determining the action continuity feature between the first device 104a and the one or more second devices 104b-104n. Examples of the parameters related to each neural network layer may be, but are not limited to, activation functions, biases, input weights, output weights, and so on, related to the layers of the neural network.

The correlation identifier 306 may update the trained action continuity module 306a on detecting the action continuity feature between the first device 104a and the one or more second devices 104b-104n, each time. The correlation identifier 306 may update the action continuity module 306a may update the trained action continuity module 306a by updating the weights/co-efficient of the neural network layers of the action continuity module 306a.

For determining the action continuity feature between the first device 104a and the one or more second devices 104b-104n, the correlation identifier 306 feeds the capabilities of the first device 104a and the one or more second devices 104b-104n, and the type of data collected from the first device 104a and the one or more second devices 104b-104n to the trained action continuity module 306a as action inputs. The trained action continuity module 306a processes the action inputs received from the correlation identifier 306 and determines the action continuity feature between the first device 104a and the one or more second devices 104b-104n. Determining the action continuity feature between the first device 104a and each of the one or more second devices 104b-104n includes computing the action continuity correlation index for each of the one or more second devices 104b-104n with respect to the first device 104a. A value of the action continuity correlation index computed for each second device (104b-104n) may belong to [0, 100], which indicates how likely the one or more actions/operations of the respective second device (104b-104n) have to be continued on the first device 104a. The action continuity correlation index of 0 may indicate a lowest correlation between the associated second device (104b-104n) with respect to the first device 104a. The action continuity correlation index of 100 may indicate a highest correlation between the associated second device (104b-104n) with respect to the first device 104a.

The correlation identifier 306 trains the first reinforcement module 306b and uses the trained first reinforcement module 306b to determine the conflict resolution feature between the first device 104a and each of the one or more second devices 104b-104n.

For training the first reinforcement module 306b, the correlation identifier 306 collects the conflict training dataset and the pre-defined one or more conflict policies. The conflict training dataset may be information, which have been monitored while controlling the operations of one or more of the plurality of devices 104a-104n over a time. The conflict training dataset includes the information about the type of data collected from the contextually related devices for controlling their operations. The one or more pre-defined conflict policies may be the policies that depict the conflict among the operations of the contextually related devices. The conflict policies may be pre-defined based on the conflict information, which have been monitored while controlling the operations of one or more of the plurality of devices 104a-104n over a time. The conflict policies may also be defined manually by the user. In an example, the correlation identifier 306 collects the conflict training dataset and the pre-defined one or more conflict policies from the memory 202. In another example, the correlation identifier 306 collects the conflict training dataset and the pre-defined one or more conflict policies from the IoT cloud server 102 or the external server, or the like. The correlation identifier 306 feeds the collected conflict training dataset and the pre-defined one or more conflict policies to the first reinforcement module 306b. The first reinforcement module 306b processes the received training dataset and generates a conflict action. The conflict action depicts that the probability of the conflict (for example, low or high) among the one or more operations of the contextually related devices. The correlation identifier 306 assigns a positive reward to the first reinforcement module 306b if the generated conflict action is correct and assigns a negative reward to the first reinforcement module 306b if the generated conflict action is not correct. The correlation identifier 306 also updates the one or more conflict policies and the first reinforcement module 306a dynamically. The correlation identifier 306 updates the one or more conflict policies based on the generated conflict action of the first reinforcement module 306b with respect to the received conflict training dataset. The correlation identifier 306 updates the first reinforcement module 306b by reinforcing conflict observations into the first reinforcement module 306b for better generation of the conflict actions. The conflict observation may be decreased efficiency of operation of a first contextually related device based on the operation of a second contextually related device. For example, the first reinforcement module 306b predicts a time to cool a room based on the AC's previous cooling data. However, in case a window is open the model prediction of cooling time may fail. In such a case the first reinforcement module 306b analyzes the states of contextually related device to identify that the open window (i.e., multipurpose sensor attached to window in open state) effects cooling of the AC and updates its policy to generation conflict information/recommendation.

For determining the conflict resolution feature between the first device 104a and each of the one or more second devices 104b-104n, the correlation identifier 306 feeds the type of data collected from the first device 104a and the one or more second devices 104b-104n to the trained first reinforcement module 306b as conflict inputs. The trained first reinforcement module 306b processes the conflict inputs received from the correlation identifier 306 and determines the conflict resolution feature between the first device 104a and the one or more second devices 104b-104n. Determining the conflict resolution feature between the first device 104a and each of the one or more second devices 104b-104n includes computing the conflict resolution correlation index for each of the one or more second devices 104b-104n with respect to the first device 104a. The conflict resolution correlation index may include a value of 0-100, wherein the values 0 and 100 indicate the lowest probability of conflict and the highest probability of conflict, respectively, among the operations of the first device 104a and the respective second device (104b-104n).

The correlation identifier 306 trains the second reinforcement module 306c and uses the trained second reinforcement module 306c to determine the failure resolution feature between the first device 104a and each of the one or more second devices 104b-104n.

For training the second reinforcement module 306c, the correlation identifier 306 collects the failure training dataset and the pre-defined one or more failure policies. The failure training may include information, which have been monitored while controlling the operations of one or more of the plurality of devices 104b-104n over a time. The conflict training dataset includes information about the type of data collected from the contextually related devices for controlling their operations. The failure policy may be the policy defined for detecting the failure in the operations of one of the contextually related devices with respect to the current operating context of the other devices. The failure policies may be pre-defined based on the failure information, which have been monitored while controlling the operations of one or more of the plurality of devices 104a-104n over a time. The failure policies may also be manually defined by the user. The failure information depicts the failure in the operation of one of the contextual related devices due to the one or more operations or context of the other contextual related devices. In an example, the correlation identifier 306 collects the failure training dataset and the pre-defined one or more failure policies from the memory 202. In another example, the correlation identifier 306 collects the failure training dataset and the pre-defined one or more failure policies from the IoT cloud server 102 or the external server, or the like. The correlation identifier 306 feeds the collected failure training dataset and the pre-defined one or more failure policies to the second reinforcement module 306c. The second reinforcement module 306c processes the received failure training dataset and generates a failure action. The failure action depicts a probability of failure (for example, low or high) expected in the one or more operations of one of the contextually related devices due to the operations of the other contextually related devices. The correlation identifier 306 assigns a positive reward to the second reinforcement module 306c if the generated failure action is correct and assigns a negative reward to the second reinforcement module 306c if the generated failure action is not correct. The correlation identifier 306 also updates the one or more failure policies and the second reinforcement module 306c dynamically. The correlation identifier 306 updates the one or more failure policies based on the generated failure action of the second reinforcement module 306c with respect to the received failure training dataset. The correlation identifier 306 updates the second reinforcement module 306c by reinforcing failure observations into the second reinforcement module 306c for better generation of the failure actions. The second reinforcement module 306c may learn the failure observations based on the feedback from the contextually correlated devices. For example, the second reinforcement module 306c predicts a washer operation success. However, if the washer operation fails, the second reinforcement module 306c analyzes the state of contextually related device to identify if the state of the respective device is different from a case when the washer operation was success to deduce a new policy. If the washer operation successes, the overhead tank water sensor value was never low. However, in case of washer operation failure due to lack of water in the overhead tank the water sensor value may be low water level. This change in water sensor state (i.e., low water sensor) resulting in washer failure is derived by the second reinforcement module 306c by analyzing the states of the contextually related devices.

For determining the failure resolution feature between the first device 104a and each of the one or more second devices 104b-104n, the correlation identifier 306 feeds the type of data collected from the first device 104a and the one or more second devices 104b-104n to the trained second reinforcement module 306c as failure inputs. The trained second reinforcement module 306c processes the failure inputs received from the correlation identifier 306 and determines the failure resolution feature between the first device 104a and each of the one or more second devices 104b-104n. Determining the failure resolution feature between the first device 104a and each of the one or more second devices 104b-104n includes computing the failure resolution correlation index for each of the one or more second devices 104b-104n with respect to the first device 104a. The failure resolution correlation index may include values of 0-100, wherein the values 0 and 100 indicate the lowest probability and the highest probability, respectively, of expecting the failure in the operations of the first device 104a with respect to the current operating context of the respective second device (104b-104n). The correlation identifier 306 provides the identified correlation features with the associated correlation indices to the recommendation manager 308.

The recommendation manager 308 may be configured to create the one or more semantic actions and provide the created one or more semantic actions as the recommendations for controlling the operations of the first device 104a and/or the one or more second devices 104b-104n. For creating the one or more semantic actions, the recommendation manager 308 ranks each correlation feature based on the associated correlation index. The recommendation manager 308 creates the one or more semantic actions based on the ranking of each correlation feature and the data collected from the first device 104a and the one or more second devices 104b-104n.

The recommendation manager 308 provides the created one or more semantic actions to the outputter 208 to provide the created one or more semantic actions to the user as the recommendations for controlling the operations of the first device 104a and/or the one or more second devices 104b-104n.

The recommendation manager 308 may also configured to control the operations of the first device 104a and/or the one or more second devices 104b-104n, on receiving the inputs of the user from the outputter 208 after providing the recommendations to the user. Alternatively, the recommendation manager 308 may also configured to control the operations of the first device 104a and/or the one or more second devices 104b-104n, based on the created one or more semantic actions.

The recommendation manager 308 may also be configured to recommend the configurations for the first device 104a based on the one or more contents being rendered on the one or more second devices 104b-104n. In an example, the recommendation may recommend the configurations for a bulb (an example first device 104a) based on a type of content being played on a TV (an example second device (104b-104n) determined for the first device 104a). The configurations may include at least one of, turning ON the bulb, turning OFF the bulb, brightness settings, dimmer settings, or the like.

The recommendation manager 308 may also be configured to recommend the configurations of the first device 104a for the one or more second devices 104b-104n, based on the data collected from the one or more second devices 104a-104n and the correlation between the first device 104a and the one or more second devices 104b-104n. In an example, the recommendation manager 308 may recommend a dimmer setting (an example configuration) of a first bulb (an example first device 104a) to a second bulb (an example second device (104b-104n) determined for the first device 104a) present in a same location.

FIGS. 2 and 3 show blocks of the electronic device 106, but it is to be understood that other embodiments are not limited thereon. In other embodiments, the electronic device 106 may include a greater or lesser number of blocks. Further, the labels or names of the blocks are used only for illustrative purpose and does not limit the scope of the embodiments herein. One or more blocks can be combined together to perform same or substantially similar function in the electronic device 106.

Figure 4:
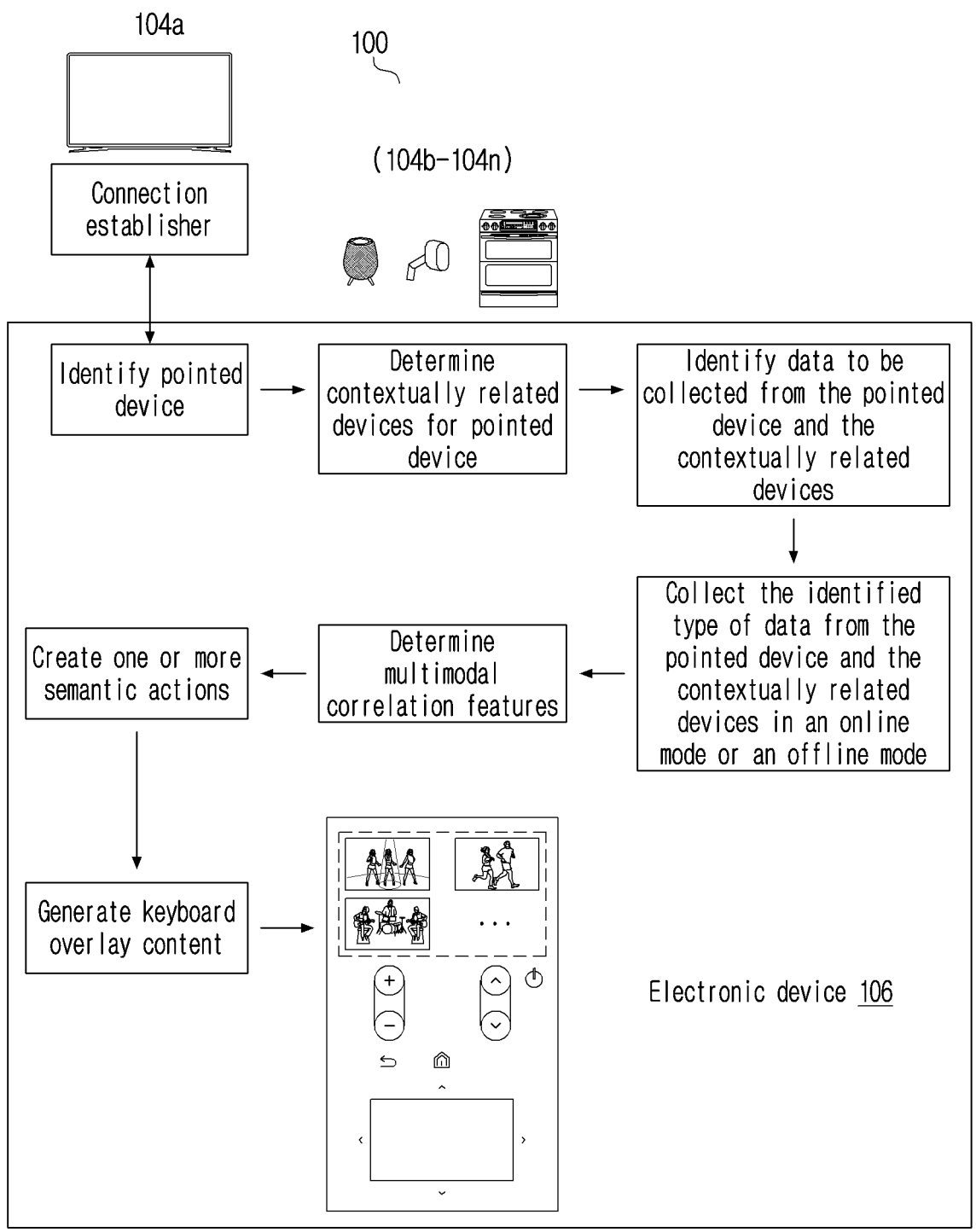
FIG. 4 depicts an example conceptual diagram of an IoT system, wherein each device is controlled based on capabilities and current operating context of dependent devices, according to an embodiment of the disclosure.

FIG. 4 depicts an example conceptual diagram of an IoT system, wherein each device is controlled based on capabilities and current operating context of dependent devices, according to an embodiment of the disclosure.

Referring to FIGS. 1A, 1B, and 4, the IoT system 100 includes the IoT cloud server 102, the plurality of devices 104a-104n, and the electronic device 106. The electronic device 106 may be configured to control the operations of the plurality of devices 104a-104n based on the correlation between each other.

Consider an example scenario, wherein the user points a TV (an example of the first device 104a) deployed in the IoT environment using the UWB supported on the electronic device 106. In such a scenario, the electronic device 106 identifies the TV as the pointed device for controlling. Determining the contextually related devices 104b-104n for the TV is depicted in FIG. 5.

Figure 5:
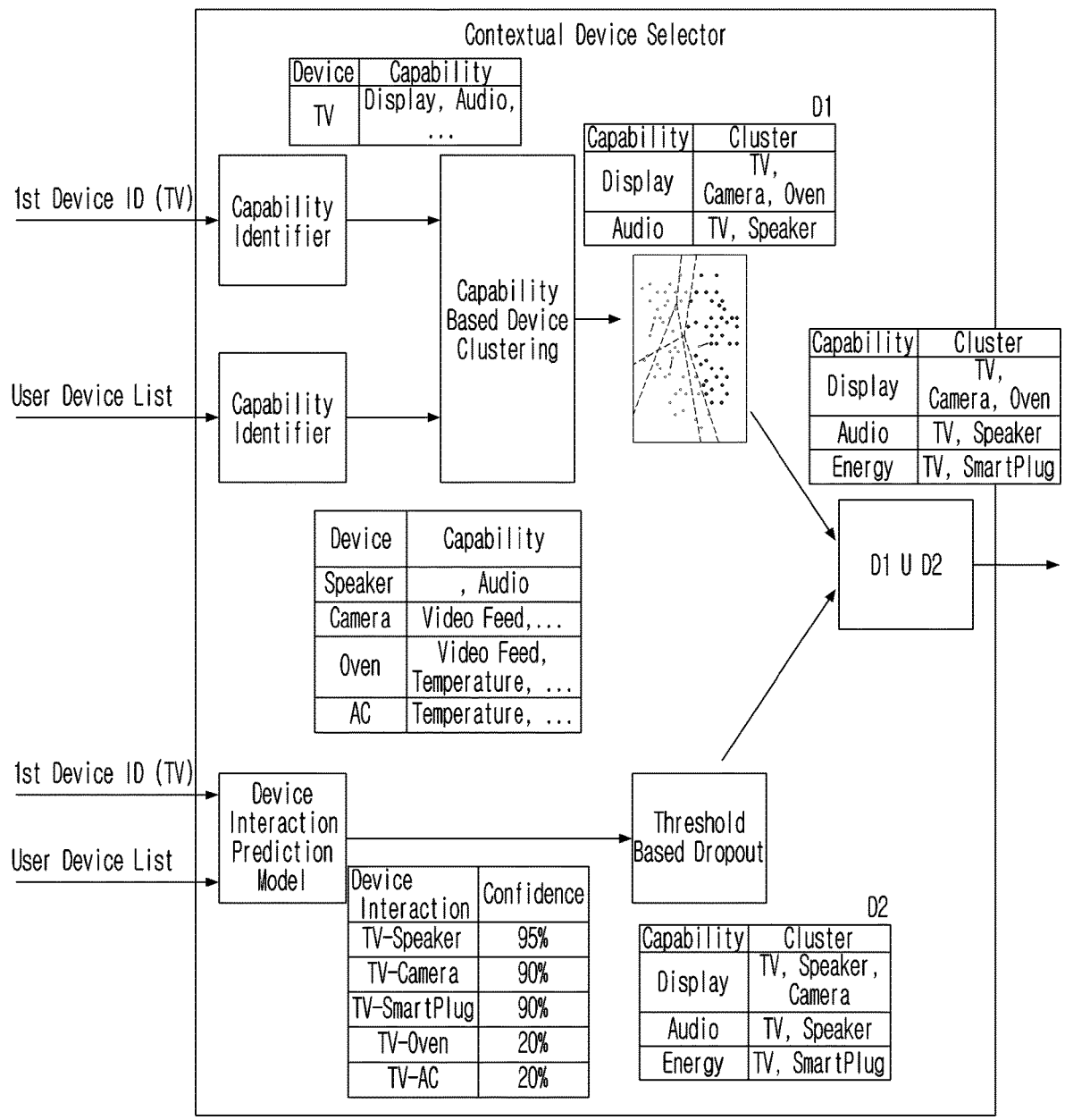
FIG. 5 is an example diagram depicting determination of contextually related devices for a pointed device, according to an embodiment of the disclosure.

FIG. 5 is an example diagram depicting determination of contextually related devices for a pointed device, according to an embodiment of the disclosure.

Referring to FIGS. 1A, 1B, and 5, the electronic device 106 fetches the list of devices registered with the IoT cloud server 102 or the electronic device 106 by accessing the device database 212. The list of devices may include at least one of, the speaker, the camera, the oven, and an AC. The electronic device 106 determines the capabilities of each device present in the fetched list of devices and the capabilities of TV using the device database 212. In an example herein, the electronic device 106 determines the capabilities of the TV as, an audio, and a display/video feed. Similarly, the electronic device 106 determines the capabilities of the speaker, the camera, the oven, and the AC, as the audio, the video feed, the video feed, and temperature, and temperature, respectively. The electronic device 106 forms the cluster of devices with respect to each of the determined capabilities (the audio, and the display/video feed) of the TV. The formed cluster of devices with respect to the audio includes the TV, and the speaker. The formed cluster of devices with respect to the display/video feed includes the TV, the camera, and the oven. The electronic device 106 determines the speaker, the camera, and the oven, as the first set of relevant devices for the TV.

In parallel to determining the first set of relevant devices for the TV, the electronic device 106 determines the second set of relevant devices for the TV. For determining the second set of relevant devices, the electronic device 106 fetches the list of devices registered with the IoT cloud server 102 or the electronic device 106 by accessing the device database 212. The list of devices may include at least one of, a speaker, a camera, a smart plug, an oven with built in camera, and an AC. The electronic device 106 determines the capabilities of the TV as, an audio, and a display/video feed. Similarly, the electronic device 106 determines the capabilities of the speaker, the camera, the smart plug, the oven, and the AC, as the audio, energy, the video feed, the video feed, and temperature, and temperature, respectively. The electronic device 106 assigns the confidence score for the camera, the smart plug, the oven, and the AC with respect to the TV as, 95%, 90%, 90%, 20%, and 20%, by determining possibilities of interactions between the devices and the TV based on their capabilities. The electronic device 106 discards the oven and the AC, as the confidence score of the oven and the AC is lesser than the interaction threshold (for example, 50%). The electronic device 106 determines the speaker, the camera, and the smart plug as the second set of relevant devices for the TV.

The electronic device 106 performs the union of the first set of relevant devices and the second set of relevant devices to form the contextually related devices for the TV. In an example, the electronic device 106 determines the speaker, the camera, the oven, and the smart plug, as the contextually related devices for the TV.

On determining the contextually related devices for the TV, the electronic device 106 identifies the type of data to be collected from the TV and the associated contextually related devices. Identifying the type of data to be collected from the TV and the associated contextually related devices is depicted in FIG. 6.

Figure 6:
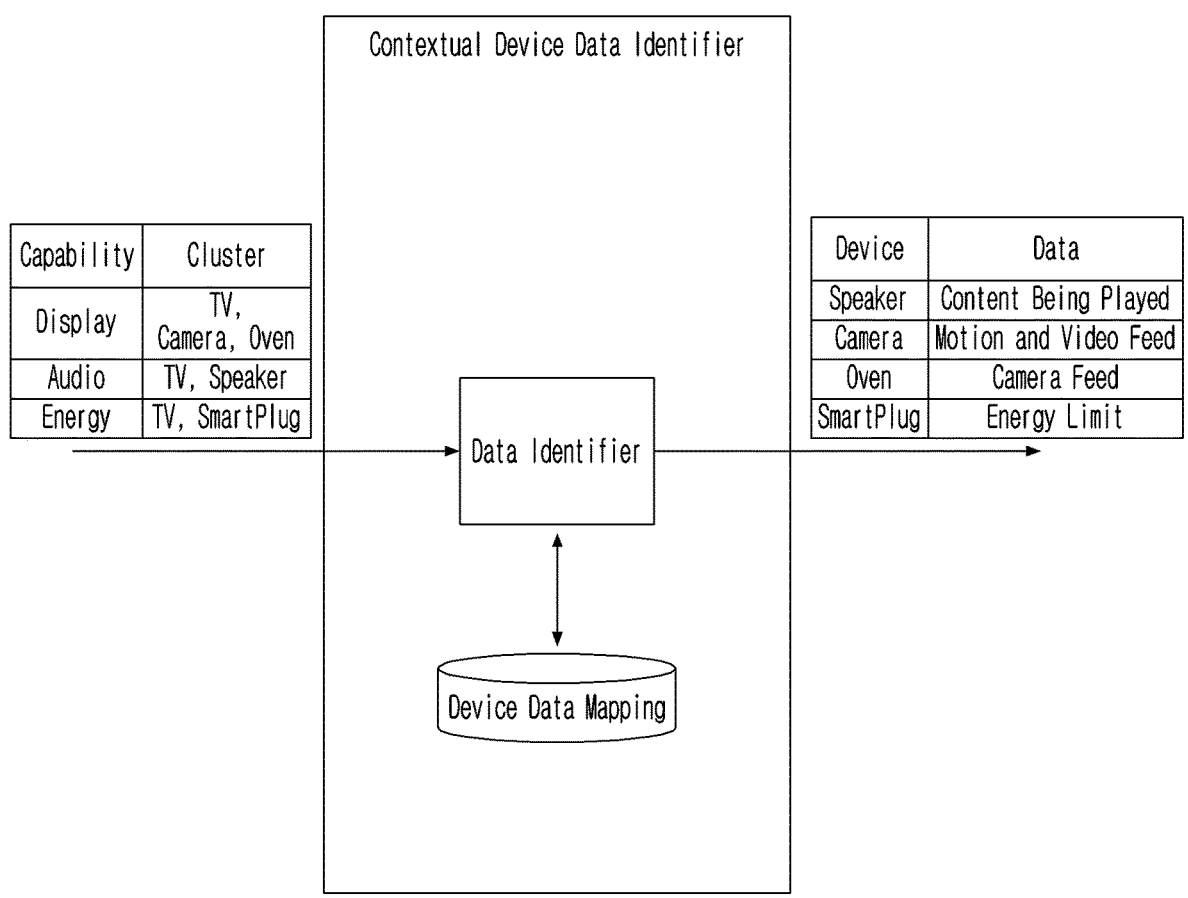
FIG. 6 is an example diagram depicting identification of a type of data to collect from a pointed device and contextually related devices, according to an embodiment of the disclosure.

FIG. 6 is an example diagram depicting identification of a type of data to collect from a pointed device and contextually related devices, according to an embodiment of the disclosure.

Referring to FIGS. 1A, 1B, and 6, the electronic device 106 creates the device-capabilities pairs, which include an audio pair, a display pair, and an energy pair. The audio pair includes the TV and the speaker. The display pair includes the TV, the camera, and the oven. The energy pair includes the TV, and the smart plug. The electronic device 106 queries the device capabilities mapping database 214 and receives information about the type of data to be collected from the devices associated with each capability from the device capabilities mapping database 214. In an example, the type of data required to collected from the device includes at least one of, the state of the device, the current operating context of the device, the location of the device, or the like.

Figure 7:
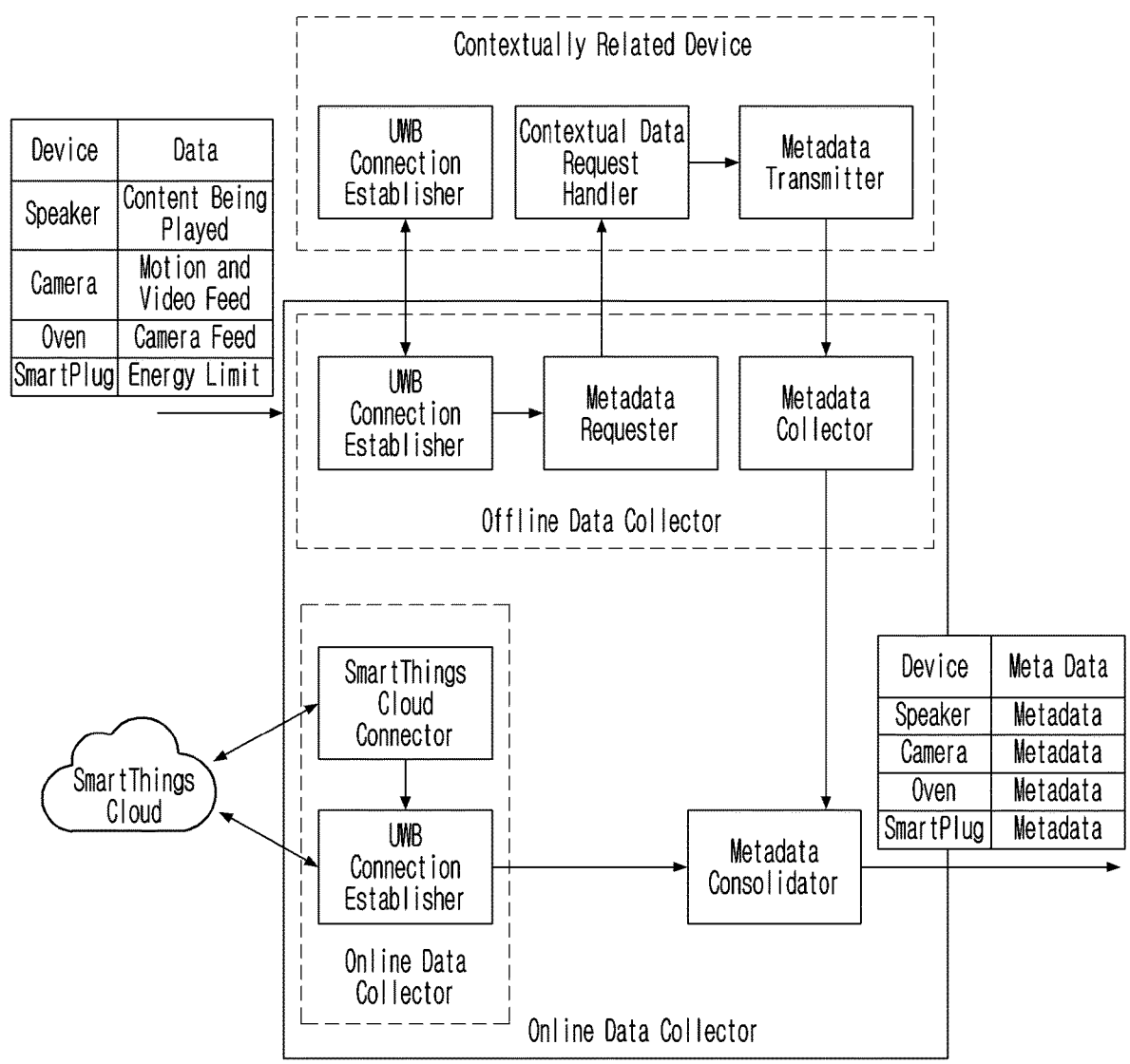
FIG. 7 is an example diagram depicting collection of data from a pointed device and contextually related devices in an online mode and in an offline mode, according to an embodiment of the disclosure.

FIG. 7 is an example diagram depicting collection of data from a pointed device and contextually related devices in an online mode and in an offline mode, according to an embodiment of the disclosure.

Referring to FIGS. 1A, 1B, and 7, the electronic device 106 collects the identified type of data from the TV and the associated contextually related devices in the online mode or the offline mode. Collecting the data from the devices in the online mode and the offline mode is depicted in FIG. 7. In the online mode, the electronic device 106 establishes the session with the IoT cloud server 102 over the communication method supported by the communication network 108. The electronic device 106 sends the request indicating the type of data/metadata to be collected from the TV and the associated contextually related devices to the IoT cloud server 102. The IoT cloud server 102 collects the indicated type of data/metadata from the TV and the associated contextually related devices and forwards the collected data to the electronic device 106.

In the offline mode, the electronic device 106 establishes the session with the TV and the associated contextually related devices over the communication method supported by the communication network 108 (for example herein, the UWB). The electronic device 106 sends the request indicating the type of data required from the TV and the associated contextually related devices. The electronic device 106 receives the determined type of data from the TV and the associated contextually related devices. The type of data collected from the TV and the associated contextually related devices is depicted in FIG. 7.

Upon collecting the data from the TV and the associated contextually related devices, the electronic device 106 determines the action continuity feature, the conflict resolution feature, and the failure resolution feature between the TV and each of the associated contextually related devices. Embodiments herein further explain determination of the action continuity feature, the conflict resolution feature, and the failure resolution feature between the TV and each of the associated contextually related devices, but it may be obvious to a person skilled in the art that any other correlation features may be determined in the similar way.

Figure 8A:
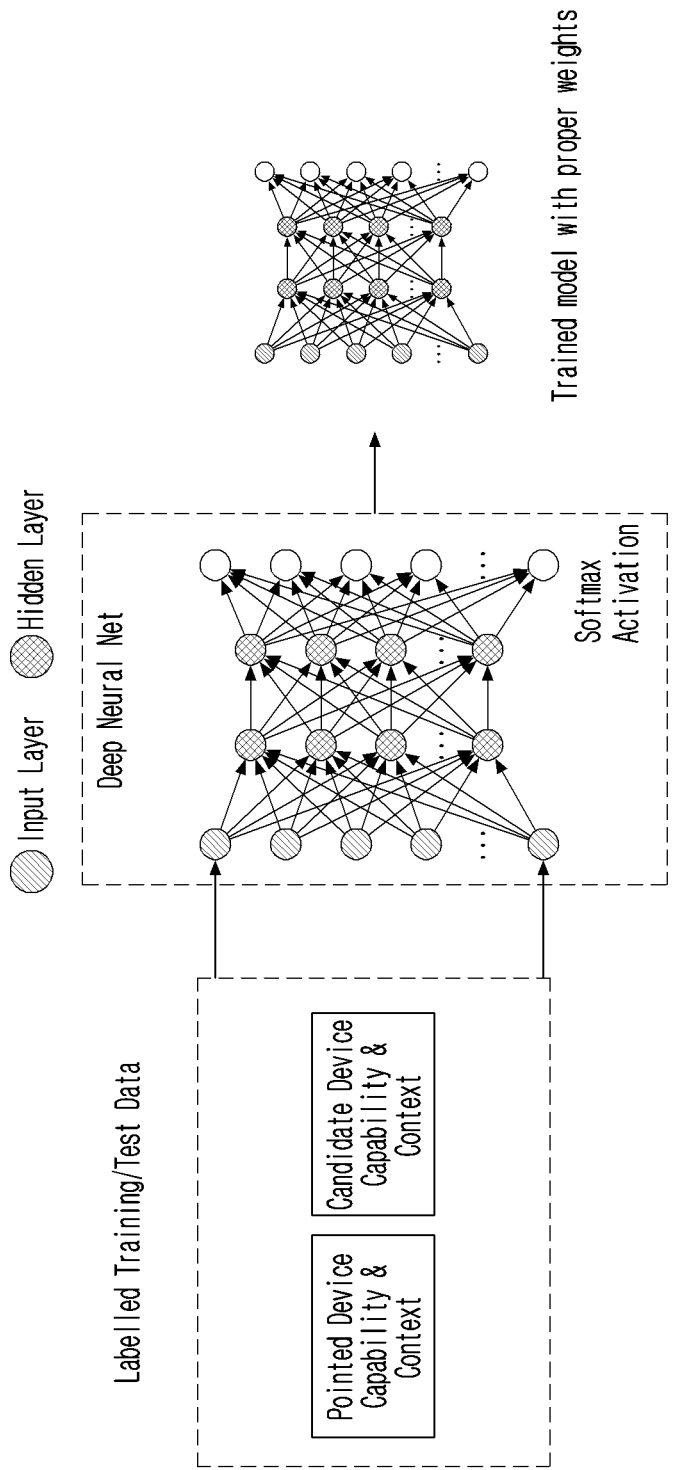
FIG. 8A is an example diagram depicting a training of an action continuity module and using a trained action continuity module to determine an action continuity feature between each contextually related device and a pointed device, according to an embodiment of the disclosure.

FIG. 8A is an example diagram depicting a training of an action continuity module and using a trained action continuity module to determine an action continuity feature between each contextually related device and a pointed device, according to an embodiment of the disclosure.

Figure 8B:
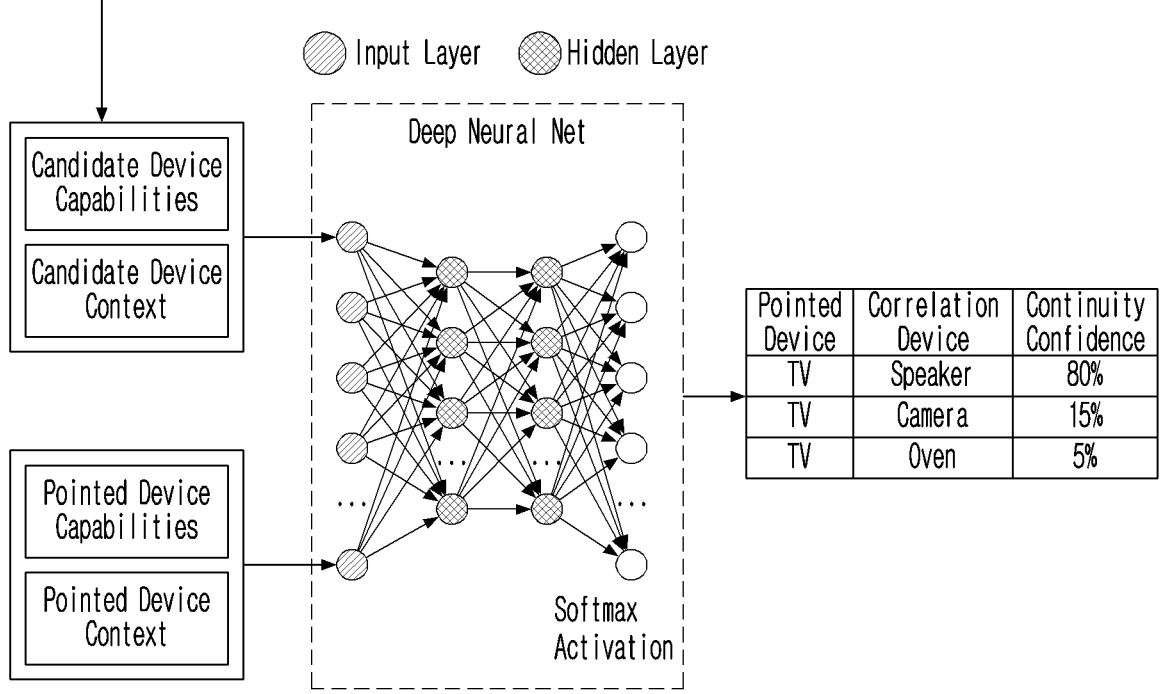
FIG. 8B is another example diagram depicting a training of an action continuity module and using a trained action continuity module to determine an action continuity feature between each contextually related device and a pointed device, according to an embodiment of the disclosure.

FIG. 8B is another example diagram depicting a training of an action continuity module and using a trained action continuity module to determine an action continuity feature between each contextually related device and a pointed device, according to an embodiment of the disclosure.

Determining the action continuity feature is depicted in FIGS. 8A and 8B. Referring to FIGS. 1A, 1B, 3, and 8A, the electronic device 106 uses the Software regression to train the action continuity module 306a using the labelled dataset of candidate devices and the associated capabilities. The trained action continuity module 306a may be a trained neural network in which a number of layers, a sequence for processing the layers and parameters related to each layer may be known and fixed for determining the action continuity feature between the first device 104a and the one or more second devices 104b-104n. Examples of the parameters related to each neural network layer may be, but are not limited to, activation functions, biases, input weights, output weights, and so on, related to the layers of the neural network.

Referring to FIG. 8B, the electronic device 106 uses the trained action continuity module 306a for determining the action continuity feature between the TV and each of the associated contextually related devices. The electronic device 106 feeds the capabilities and the data collected from the TV and the associated contextually related devices to the trained action continuity module 306a. The action continuity module 306a processes the capabilities of the data of the TV and the associated contextually related devices to determine the action continuity feature between the TV and each of the associated contextually related devices by computing the action continuity correlation index for each contextually related device with respect to the TV. The action continuity correlation index indicates the probability of continuing the or more actions/operations of the one or more contextually related devices on the TV. In an example herein, the action continuity correlation index computed for the speaker, the camera, the oven, and the smart plug with respect to the TV may be 80%, 15%, 5%, and 0, respectively. The speaker may be having the highest action continuity correlation index, compared to the camera, the oven, and the smart plug, since the state of the camera, the oven, and the smart plug does not have any content/action for continuing on the TV. Thus, the one or more actions/content/operations of the speaker may be continued on the TV, as the speaker have a strong correlation with the TV.

Figure 9A:
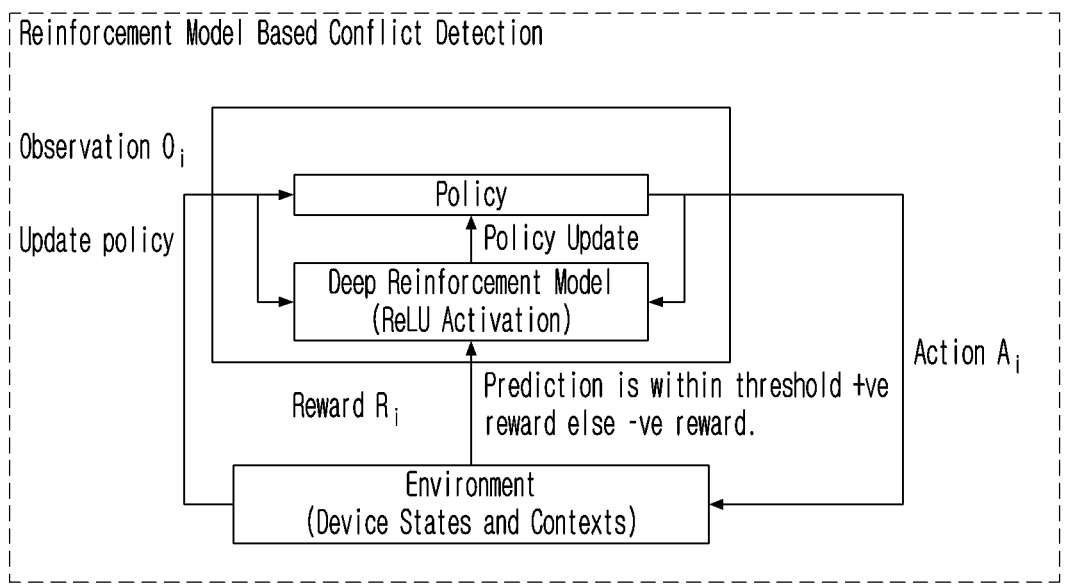
FIG. 9A is an example diagram depicting a training of a first reinforcement module and using a trained first reinforcement to determine a conflict resolution feature between each contextually related device and a pointed device, according to an embodiment of the disclosure.

FIG. 9A is an example diagram depicting a training of a first reinforcement module and using a trained first reinforcement to determine a conflict resolution feature between each contextually related device and a pointed device, according to an embodiment of the disclosure.

FIG. 9B is another example diagram depicting a training of a first reinforcement module and using a trained first reinforcement to determine a conflict resolution feature between each contextually related device and a pointed device, according to an embodiment of the disclosure.

Determining the conflict resolution feature between the TV and the associated contextually related devices is depicted in FIGS. 9A, and 9B. Referring to FIGS. 1A, 1B, 3, and 9A, the electronic device 106 trains the first reinforcement module to determine the conflict resolution feature between the TV and the associated contextually related devices. The electronic device 106 feeds the collected training dataset and the pre-defined one or more conflict policies to the first reinforcement module 306b. The first reinforcement module 306b processes the received training dataset and generates the conflict action. The conflict action depicts that the one or more operations of the contextually related device may be conflicted with the one or more operations of the other contextually related devices. The electronic device 106 assigns the positive reward to the first reinforcement module 306b if the generated conflict action is correct and assigns the negative reward to the first reinforcement module 306b if the generated conflict action is not correct. The electronic device 106 also updates the one or more conflict policies and the first reinforcement module 306b dynamically. The electronic device 106 updates the one or more conflicts based on the predicted action of the first reinforcement module 306b with respect to the received conflict training dataset. The electronic device 106 updates the first reinforcement module 306b by reinforcement the conflict observations into the first reinforcement module 306b for better generation of the conflict actions.

Referring to FIG. 9B, for determining the conflict resolution between the TV and the associated contextually related devices, the electronic device 106 feeds the data collected from the TV and the associated contextually related devices to the first reinforcement module 306b. The first reinforcement module 306b processes the data of the TV and the associated contextually related devices and determines the conflict resolution between the TV and each of the contextually related devices by computing the conflict resolution correlation index for each contextually related device with respect to the TV. The conflict resolution correlation index depicts the probability of conflict among the operations of the TV and the associated contextually related devices. In an example herein, the conflict resolution correlation index computed for the speaker, the camera, the oven, and the smart plug with respect to the TV may be 10%, 8%, 7%, and 75%, respectively. The smart plug may have the highest correlation with the TV, compared to the other devices, which depicts that continuous power consumption may conflict the operation of the TV.

Figure 10A:
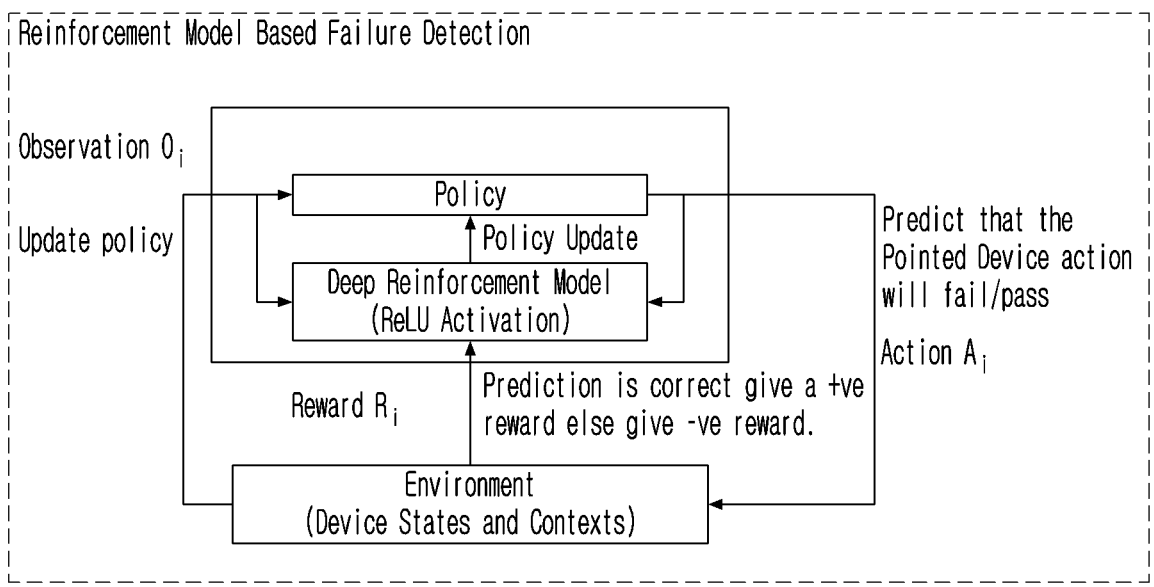
FIG. 10A is an example diagram depicting a training of a second reinforcement module and using a trained second reinforcement to determine a failure resolution feature between each contextually related device and a pointed device, according to an embodiment of the disclosure.

FIG. 10A is an example diagram depicting a training of a second reinforcement module and using a trained second reinforcement to determine a failure resolution feature between each contextually related device and a pointed device, according to an embodiment of the disclosure.

FIG. 10B is another example diagram depicting a training of a second reinforcement module and using a trained second reinforcement to determine a failure resolution feature between each contextually related device and a pointed device, according to an embodiment of the disclosure.

Determining the failure resolution feature between the TV and the associated contextually related devices is depicted in FIGS. 10A and 10B. Referring to FIGS. 1A, 1B, 3, and 10A, the electronic device 106 trains the second reinforcement module 306c to determine the failure resolution feature between the TV and the associated contextually related devices. The electronic device 106 feeds the failure training dataset and the pre-defined one or more failure policies to the second reinforcement module 306c. The second reinforcement module 306c processes the received failure training dataset and generates the failure action. The failure action depicts that the one or more operations of the TV may fail due to the one or more operations of the one or more contextually related devices. The electronic device 106 assigns the positive reward to the second reinforcement module 306c if the generated failure action is correct and assigns the negative reward to the second reinforcement module 306c if the generated failure action is not correct. The electronic device 106 also updates the one or more failure policies and the second reinforcement module 306c dynamically. The electronic device 106 updates the one or more failure policies based on the generated failure action of the second reinforcement module 306c with respect to the received failure training dataset. The electronic device 106 updates the second reinforcement module 306c by reinforcing the failure observations into the second reinforcement module 306c for better generation of the failure actions.

Referring to FIGS. 1A, 1B, 3, and 10B, for determining the failure resolution between the TV and the associated contextually related devices, the electronic device 106 feeds the data collected from the TV and the associated contextually related devices to the trained second reinforcement module 306c. The second reinforcement module 306c processes the data of the TV and the associated contextually related devices and determines the failure resolution between the TV and each of the contextually related devices by computing the failure resolution correlation index for each contextually related device with respect to the TV. The failure resolution correlation index depicts the probability of failure in the operations of the TV due to the operations of the associated contextually related devices. In an example herein, the failure resolution correlation index computed for the speaker, the camera, the oven, and the smart plug with respect to the TV may be 10%, 10%, 10%, and 70%, respectively. The smart plug may have the highest correlation with the TV, compared to the other devices, which depicts that continuous power consumption may failure the operations of the TV.

Based on the determined correlation features between the TV and the associated contextually related devices, the electronic device 106 provides the recommendations for controlling the operations of the TV or the associated contextually related devices. Providing recommendations for controlling the operations of the TV or the associated contextually related devices is depicted in FIG. 11.

Figure 11:
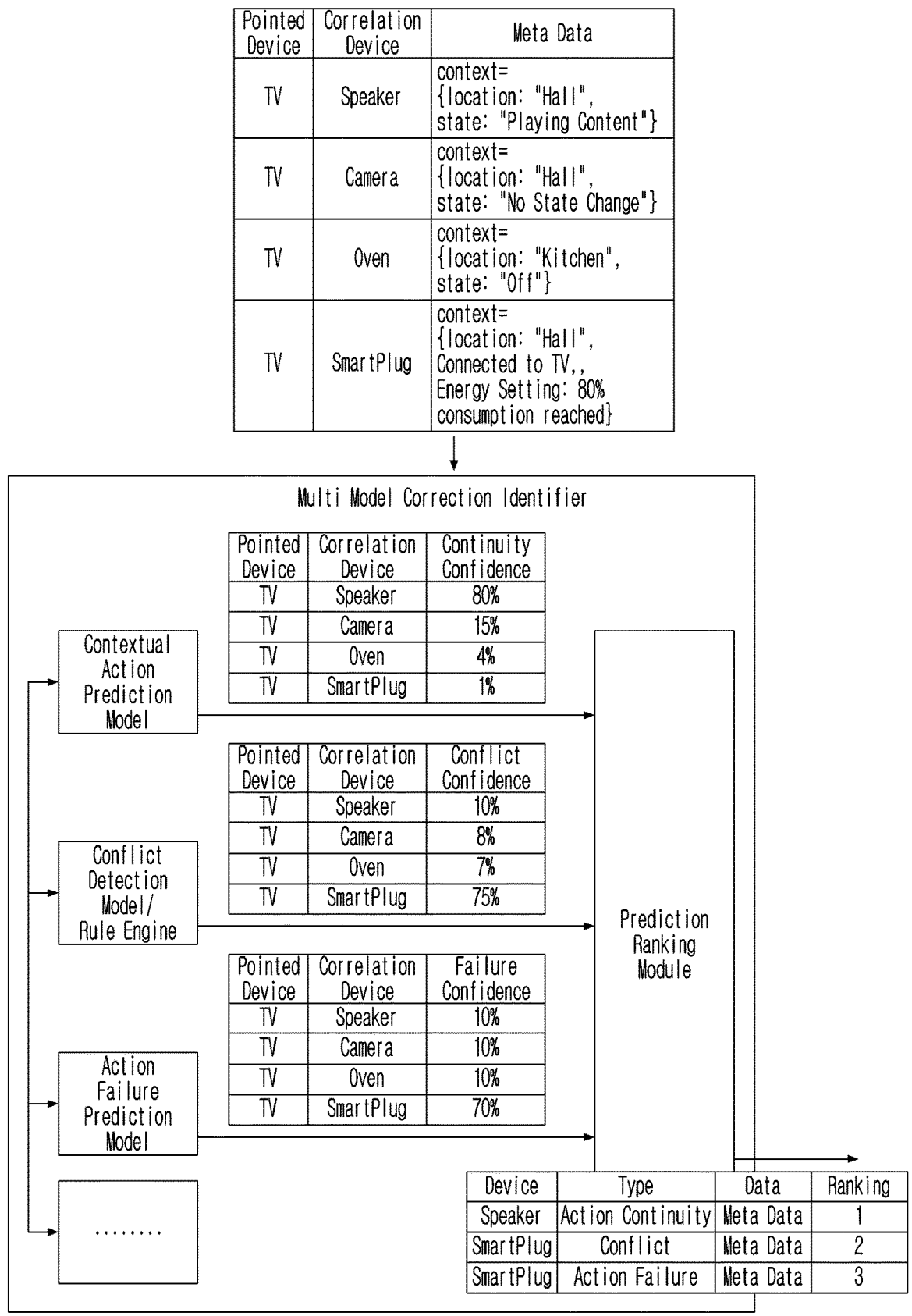
FIG. 11 is an example diagram depicting recommendation of one or more semantic actions for controlling operations of a pointed device and associated contextually related devices, according to an embodiment of the disclosure.

FIG. 11 is an example diagram depicting recommendation of one or more semantic actions for controlling operations of a pointed device and associated contextually related devices, according to an embodiment of the disclosure.

Referring to FIGS. 1A, 1B, and 11, the electronic device 106 ranks the action continuity feature, the conflict resolution feature, and the failure resolution feature between the TV and each of the associated contextually correlated devices, based on the capabilities and the correlation index associated with each contextually correlated device. The correlation index includes at least one of, the action continuity correlation index, the conflict resolution correlation index, and the failure resolution correlation index. In an example herein, the electronic device 106 ranks the action continuity feature between the TV and the speaker as 1, the conflict resolution feature between the TV and the smart plug as 2, and the failure resolution feature between the TV and the smart plug as 3.

The electronic device 106 creates the one or more semantic actions based on the ranking of the correlation features between the TV and the associated correlation devices. In an example herein, the semantic action includes a suggestion to continue the content being played on the speaker on the TV, and an alert indicating that continued usage of the TV may damage the TV.

The electronic device 106 provides information about the contextually related devices for the TV, and their current operating context, and the semantic actions as the recommendations to the user for controlling the operations of the TV. The electronic device 106 renders the semantic actions as the keyboard overlayed content.

The electronic device 106 controls the operations of the TV, on selecting any one of the semantic actions by the user. In an example, the electronic device 106 may enable the TV to play the content/audio being played on the speaker, if the user selects the suggestion to continue the content being played on the speaker on the TV. In another example, the electronic device 106 turns OFF the TV, if the user selects the alert indicating that continued usage of the TV may damage the TV.

Figure 12:
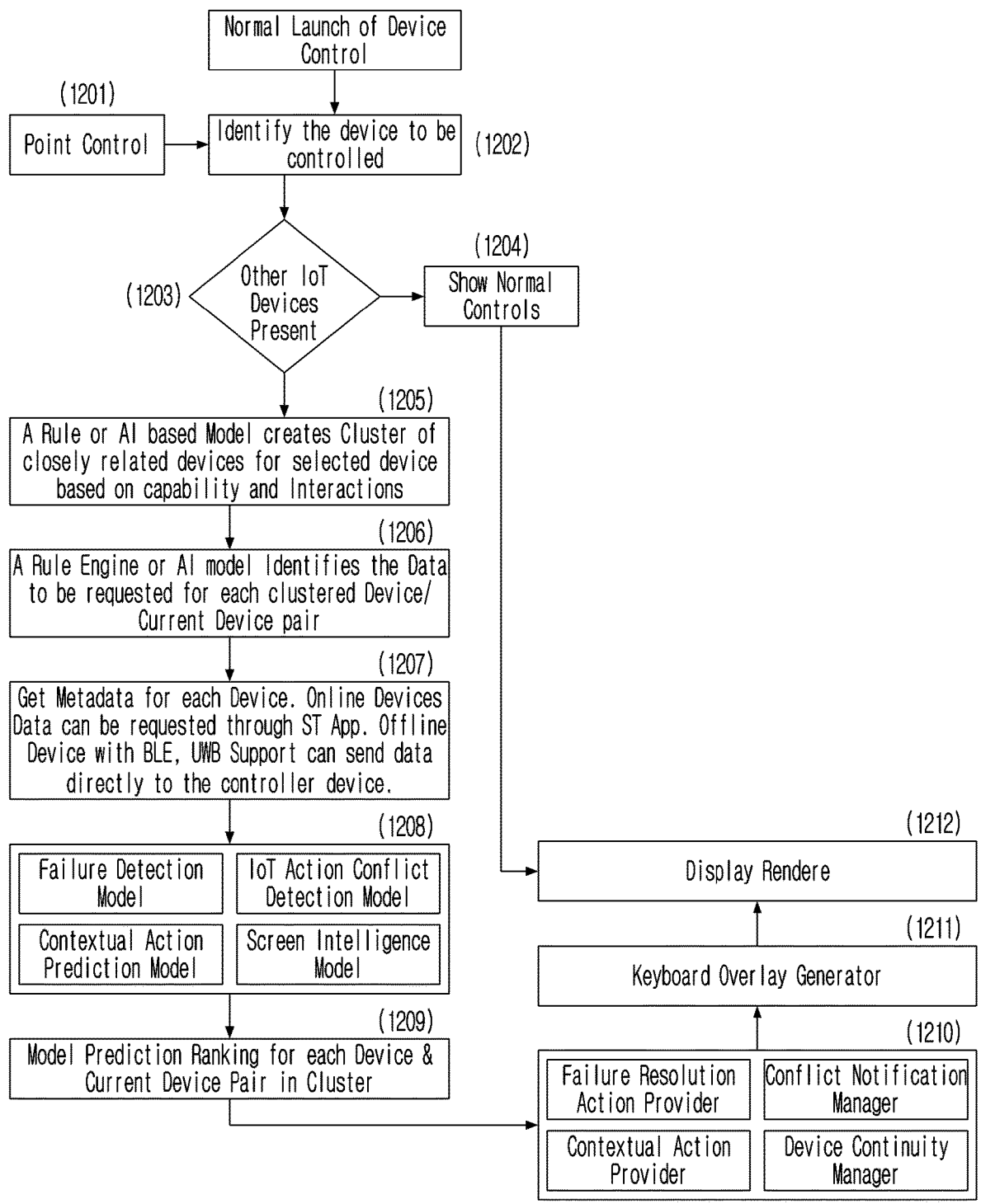
FIG. 12 is a flow diagram depicting controlling of operations of a plurality of devices in an IoT environment, according to an embodiment of the disclosure.

FIG. 12 is a flow diagram depicting controlling of operations of a plurality of devices in an IoT environment, according to an embodiment of the disclosure.

At operation 1202, the electronic device 106 identifies the first device 104a pointed to be controlled. In an example, the user (at operation 1201) points the first device 104a for controlling using at least one of the communication methods supported by the communication network 108. At operation 1203, the electronic device 106 checks if any other devices present in the IoT environment. If there are no other devices present in the IoT environment, at operation 1204, the electronic device 106 presents normal commands to the user for controlling the first device 104a.

If the other devices are present in the IoT environment, at operation 1205, the electronic device 106 determines the one or more second devices 104b-104n for the first device 104a, which are the contextually related devices for the first device 104a. The electronic device 106 determines the one or more second devices 104b-104n for the first device 104a by forming the cluster of relevant devices for the first device 104a based on the capabilities and interactions.

At operation 1206, the electronic device 106 identifies the type of data to be collected from the first device 104a and the one or more second devices 104b-104n. The electronic device 106 creates the device-capabilities pair, wherein each pair includes the capability and the first device 104a and/or the one or more second devices 104b-104n which interacts over the corresponding capability. The electronic device 106 queries the device capabilities mapping database 214 and receives the information about the type of data to be collected from the first device 104a and/or the second devices 104b-104n associated with each capability. At operation 1207, the electronic device 106 collects the identified type of data from the first device 104a and/or the one or more second devices 104b-104n. In an example, the electronic device 106 collects the identified type of data from the first device 104a and/or the one or more second devices 104b-104n in the online mode. In another example, the electronic device 106 collects the identified type of data from the first device 104a and/or the one or more second devices 104b-104n in the offline mode.

At operation 1208, the electronic device 106 determines the correlation features with the correlation indices for each of the one or more second devices 104b-104n with respect to the first device 104a. Examples of the correlation features may include at least one of, but is not limited to, the action continuity feature, the conflict resolution feature, the failure resolution feature, the screen intelligence feature, the setting suggestion feature, and so on. Examples of the correlation indices include at least one of, but is not limited to, the action continuity correlation index associated with the action continuity feature, the conflict resolution correlation index associated with the conflict resolution feature, the failure resolution correlation index associated with the failure resolution feature, the screen intelligence correlation index associated with the screen intelligence feature, the setting suggestion correlation index associated with the setting suggestion feature, and so on. The electronic device 106 determines the correlation features with the correlation indices for each of the one or more second devices 104b-104n with respect to the first device 104a based on the capabilities of the first device 104a and the one or more second devices 104b-104n, and/or the data collected from the first device 104a based on the capabilities of the first device 104a and the one or more second devices 104b-104n.

At operation 1209, the electronic device 106 ranks each correlation feature between each of the one or more second devices 104b-104n and the first device 104a, based on the associated correlation index and the data collected from the first device 104a and the corresponding second device (104b-104n).

At operation 1210, the electronic device 106 creates the one or more semantic actions based on the ranking of each correlation feature between each of the one or more second devices 104b-104n and the first device 104. Examples of the one or more semantic actions may be, but are not limited to, a suggestion to continue the operation/actions of one of the second devices 104b-104n on the first device 104a, a conflict notification, a failure notification, a contextual action suggestion, settings/configurations, and so on.

At operation 1211, the electronic device 106 generates the keyboard overlay content for each of the created one or more semantic actions. At operation 1212, the electronic device 106 renders the keyboard overlay content corresponding to the one or more semantic actions as the recommendations to the user for controlling the operations of the first device 104a and/or the one or more second devices 104b-104n.

Figure 13A:
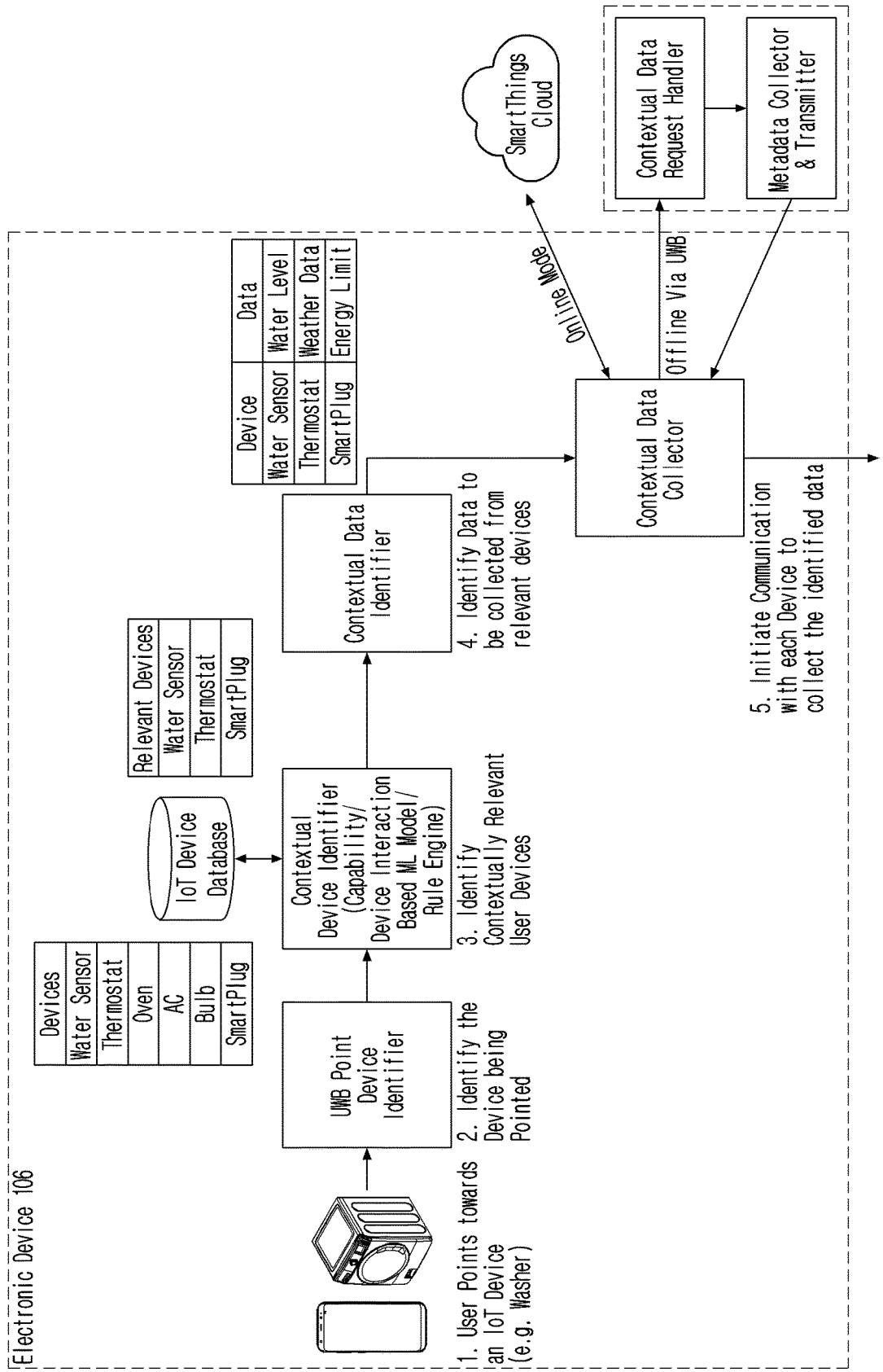
FIG. 13A depicts a use case scenario of controlling operations of one of a plurality of devices in an IoT environment, according to an embodiment of the disclosure.
Figure 13B:
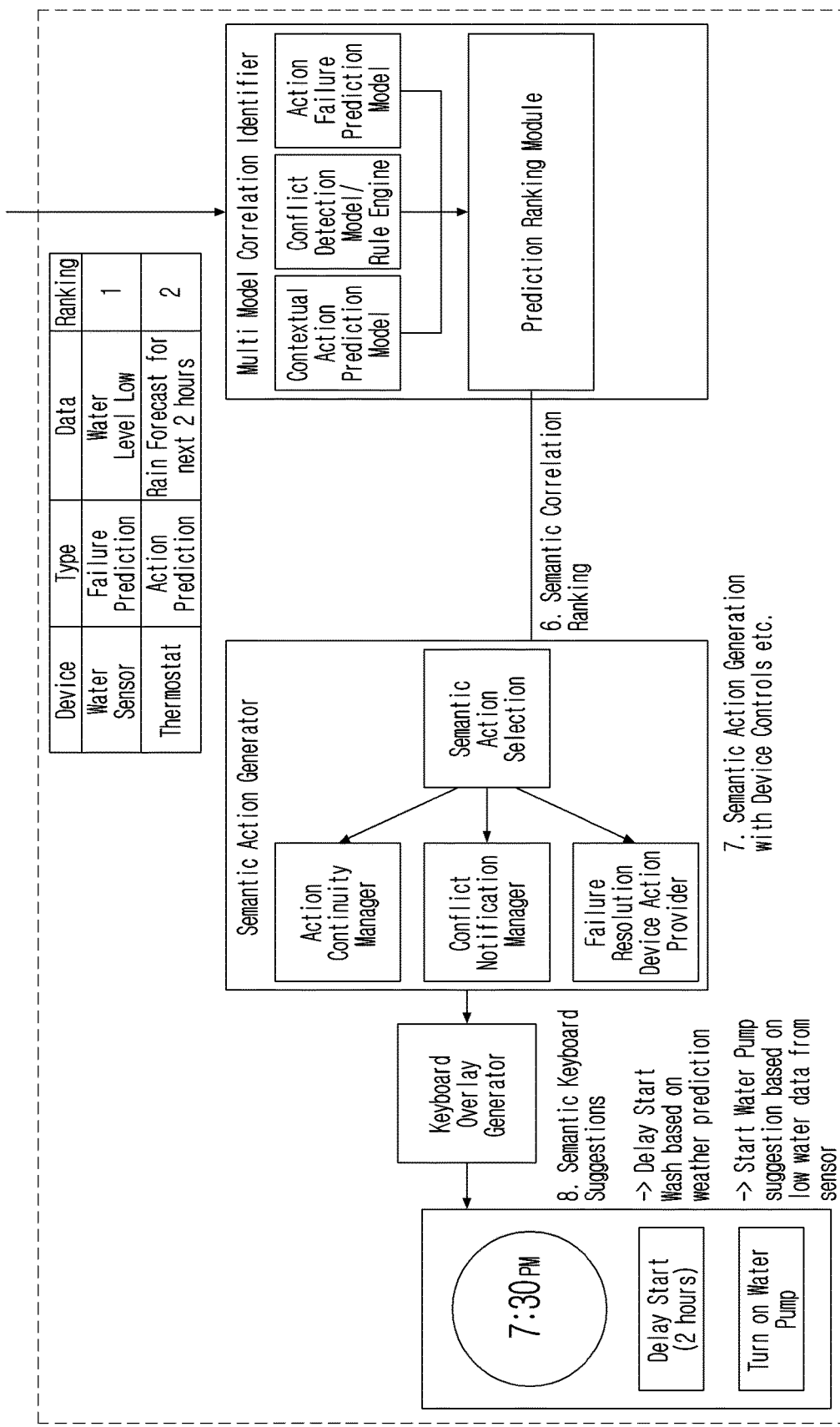
FIG. 13B depicts another use case scenario of controlling operations of one of a plurality of devices in an IoT environment, according to an embodiment of the disclosure.

FIGS. 13A and 13B depict example use case scenarios of controlling operations of one of a plurality of devices in an IoT environment, according to various embodiments of the disclosure.

Referring to FIGS. 13A and 13B, consider an example scenario, wherein the user points a washing machine/washer (an example of the first device 104a) using the UWB supported by the electronic device 106. In such a scenario, the electronic device 106 identifies the washing machine as the pointed device by the user for operating. The electronic device 106 fetches the list of devices that includes, a water sensor, a thermostat, an oven, an AC, a bulb, and a smart plug, and determines the water sensor, the thermostat, and the smart plug from the list of devices as the contextually related devices (the second devices 104b-104n) for the washing machine. The electronic device 106 identifies the type of data to be collected from the washing machine, the water sensor, the thermostat, and the smart plug. In an example, the type of data to be collected from the device includes at least one of, a state of the device, a location of the device, a current operating context of the device (such as, a water level from the water sensor, weather data from the thermostat, and an energy limit from the smart plug). The electronic device 106 collects the identified type of data from the washing machine, the water sensor, the thermostat, and the smart plug, in the online mode or in the offline mode.

Upon collecting the data, the electronic device 106 determines the action continuity feature with the action continuity correlation index, the conflict resolution feature with the conflict resolution correlation index, and the failure resolution feature with the failure resolution correlation index for the water sensor, the thermostat, and the smart plug with respect to the washing machine. The electronic device 106 ranks the failure resolution feature between the water sensor and the washing machine as 1 (as the water level is low for example), and the action continuity feature between the thermostat and the washing machine as 2 (as the weather data depicts a rain forecast for next 2 hours for example).

The electronic device 106 generates the one or more semantic actions based on the ranking of the correlation features and the data associated with the washing machine, and the water sensor, the thermostat, and the smart plug. In an example, the semantic actions may include at least one of, a suggestion to delay turning ON of the washing machine based on the weather data, and a suggestion to start a water pump based on the sensed low water level. The electronic device 106 recommends the created one or more semantic actions to the user for operating the washing machine. The electronic device 106 may recommend the created one or more semantic actions by rending the one or more semantic action as the keyboard overlayed content on the display/outputter 208 of the electronic device 106.

Figure 14A:
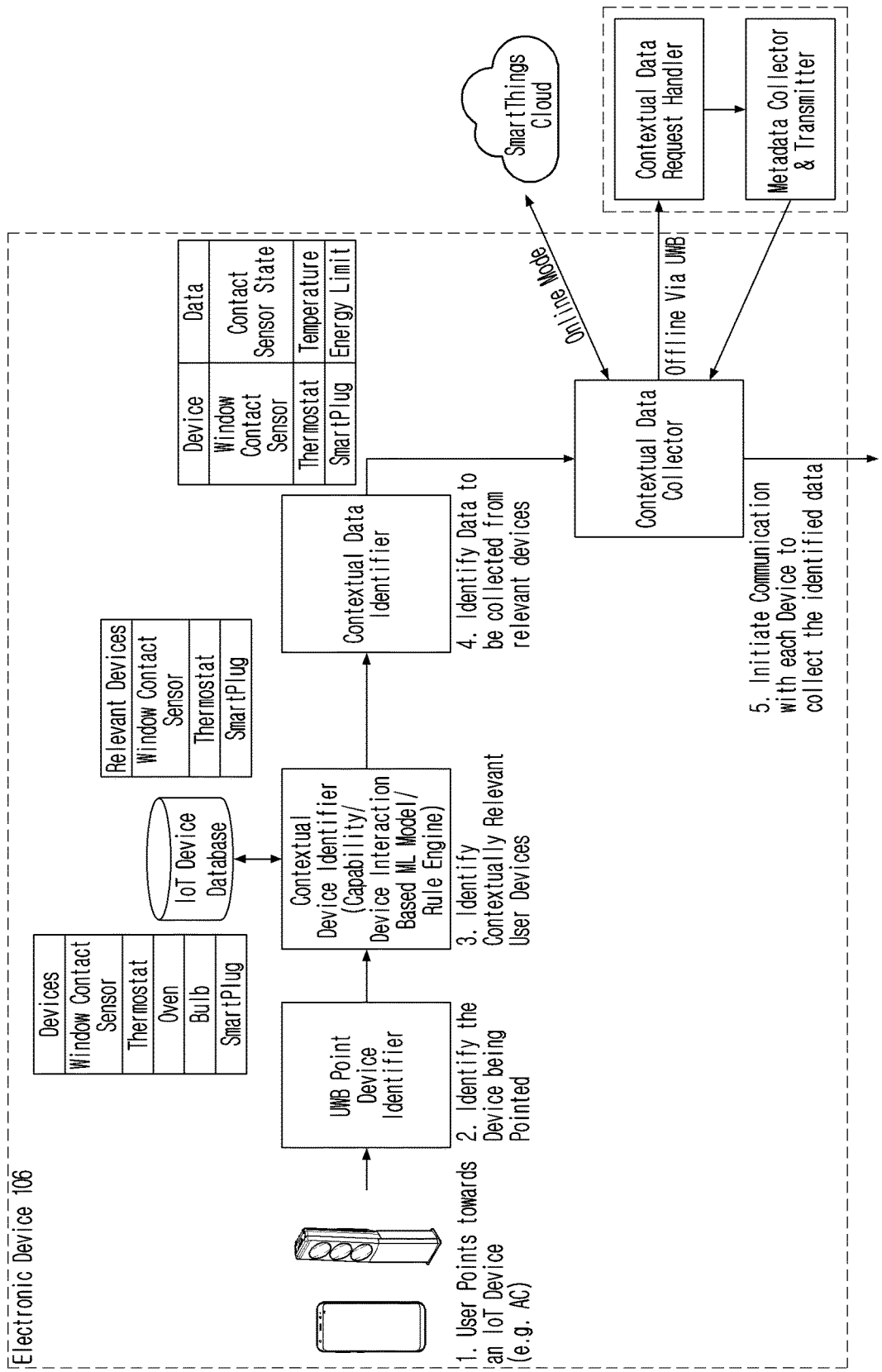
FIG. 14A depicts another use case scenario of controlling operations of one of a plurality of devices in an IoT environment, according to an embodiment of the disclosure.
Figure 14B:
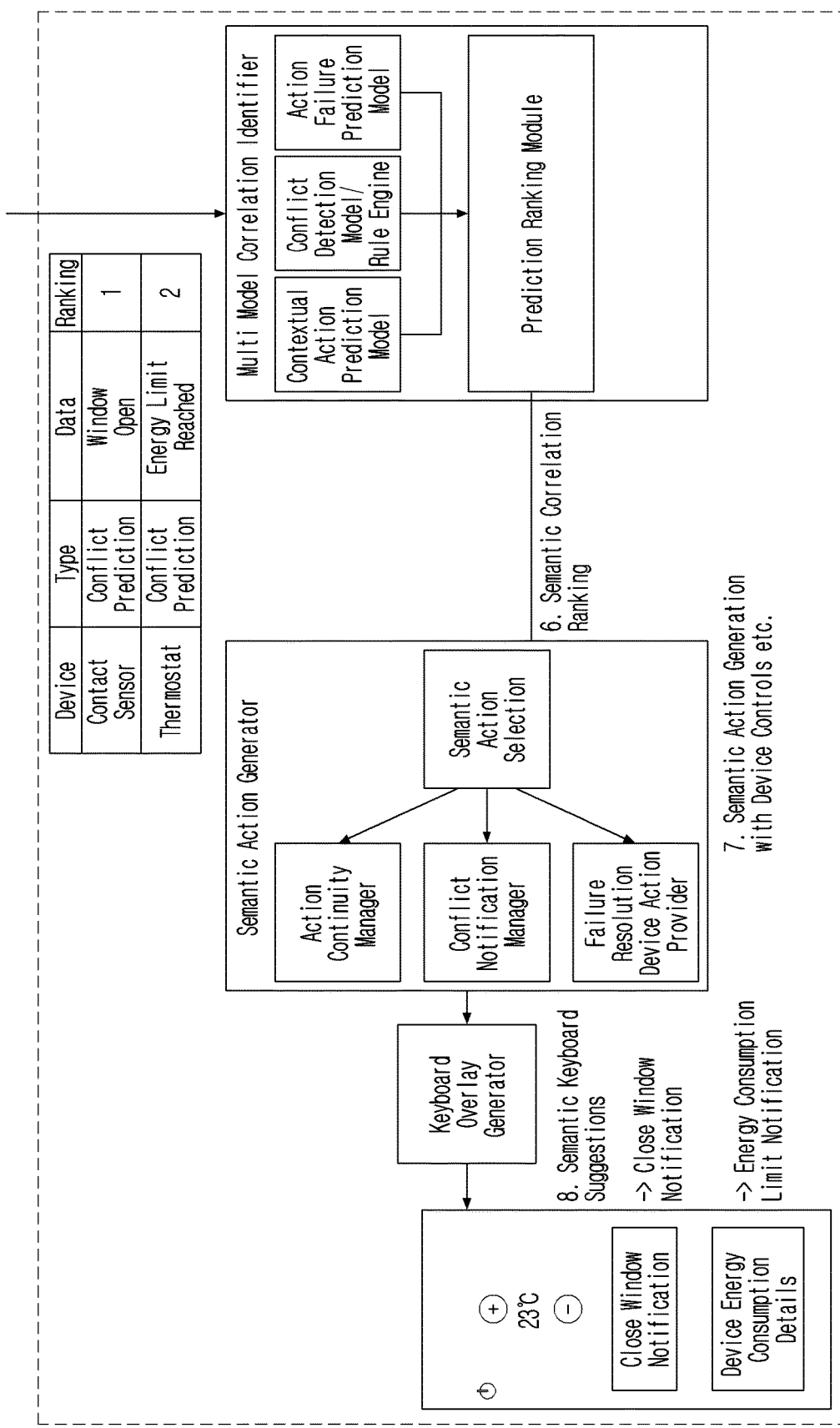
FIG. 14B depicts another use case scenario of controlling operations of one of a plurality of devices in an IoT environment, according to an embodiment of the disclosure.

FIGS. 14A and 14B depict other example use case scenarios of controlling operations of one of a plurality of devices in an IoT environment, according to various embodiments of the disclosure.

Referring to FIGS. 14A and 14B, consider an example scenario, wherein the user points an AC (an example of the first device 104a) using the UWB supported by the electronic device 106. In such a scenario, the electronic device 106 identifies the AC as the pointed device by the user for operating. The electronic device 106 fetches the list of devices that includes, a window contact sensor, a thermostat, an oven, a bulb, and a smart plug, and determines the window contact sensor, the thermostat, and the smart plug from the list of devices as the contextually related devices (the second devices 104b-104n) for the AC. The electronic device 106 identifies the type of data to be collected from the AC, the window-contact sensor, the thermostat, and the smart plug. In an example, the type of data to be collected from the device includes at least one of, a state of the device, a location of the device, a current operating context of the device (such as, a contact sensor state, temperature, and energy limit). The electronic device 106 collects the identified type of data from the AC, the window-contact sensor, the thermostat, and the smart plug, in the online mode or in the offline mode.

Upon collecting the data, the electronic device 106 determines the action continuity feature with the action continuity correlation index, the conflict resolution feature with the conflict resolution correlation index, and the failure resolution feature with the failure resolution correlation index for the window contact sensor, the thermostat, and the smart plug with respect to the AC. The electronic device 106 ranks the conflict resolution feature between the water contact sensor and the AC as 1 (as windows are open for example), and the conflict resolution feature between the smart plug and the AC as 2 (as the energy limit has reached for example).

The electronic device 106 generates the one or more semantic actions based on the ranking of the correlation features and the data associated with the AC, the window-contact sensor, the thermostat, and the smart plug. In an example, the semantic actions may include at least one of, a notification to close the windows for better operating efficiency of the AC, and an energy consumption limit notification. The electronic device 106 recommends the created one or more semantic actions to the user for operating the AC. The electronic device 106 may recommend the created one or more semantic actions by rending the one or more semantic actions as the keyboard overlayed content on the display/outputter 208 of the electronic device 106.

Figure 15A:
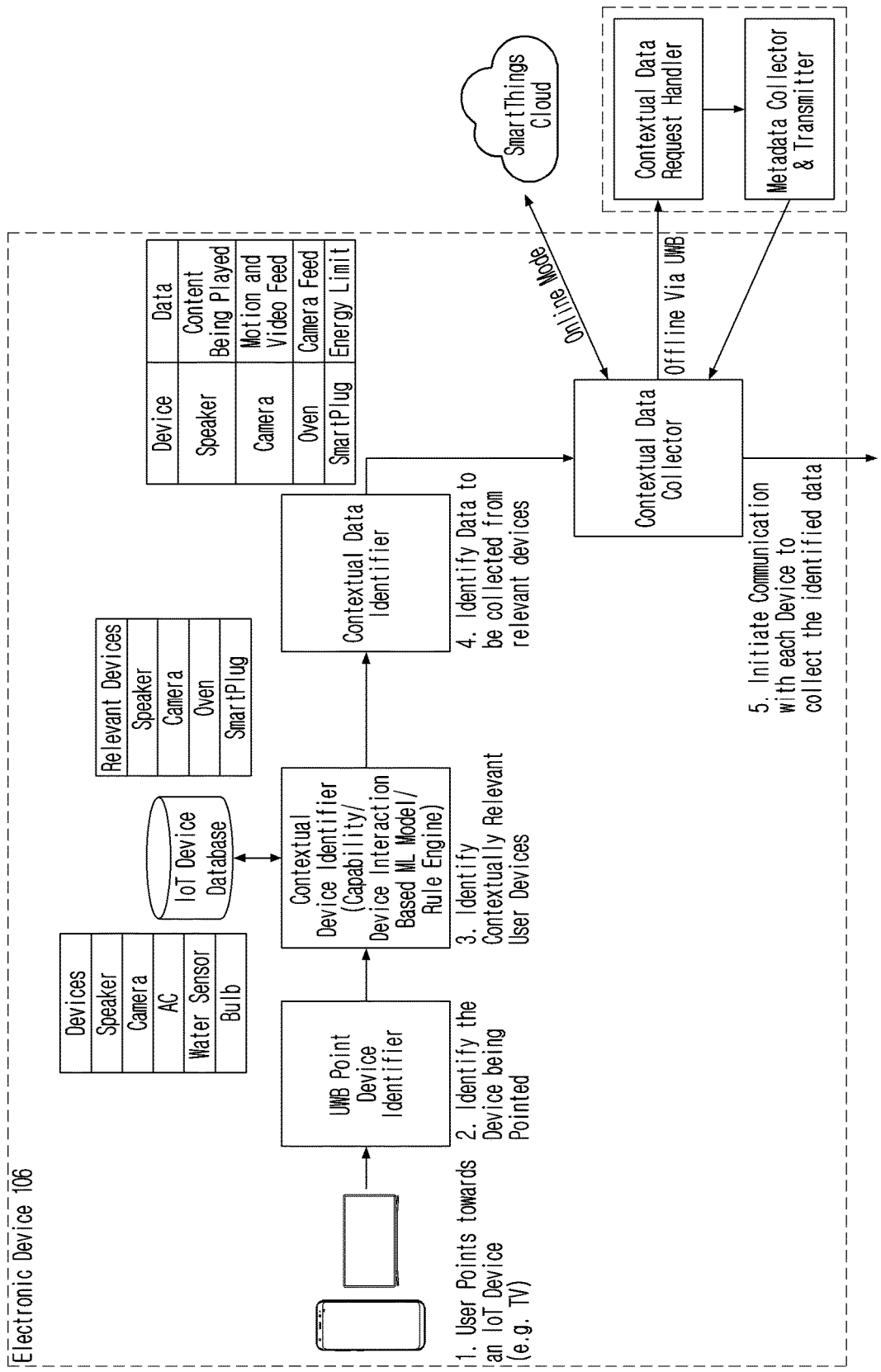
FIG. 15A depicts another use case scenario of controlling operations of one of a plurality of devices in an IoT environment, according to an embodiment of the disclosure.
Figure 15B:
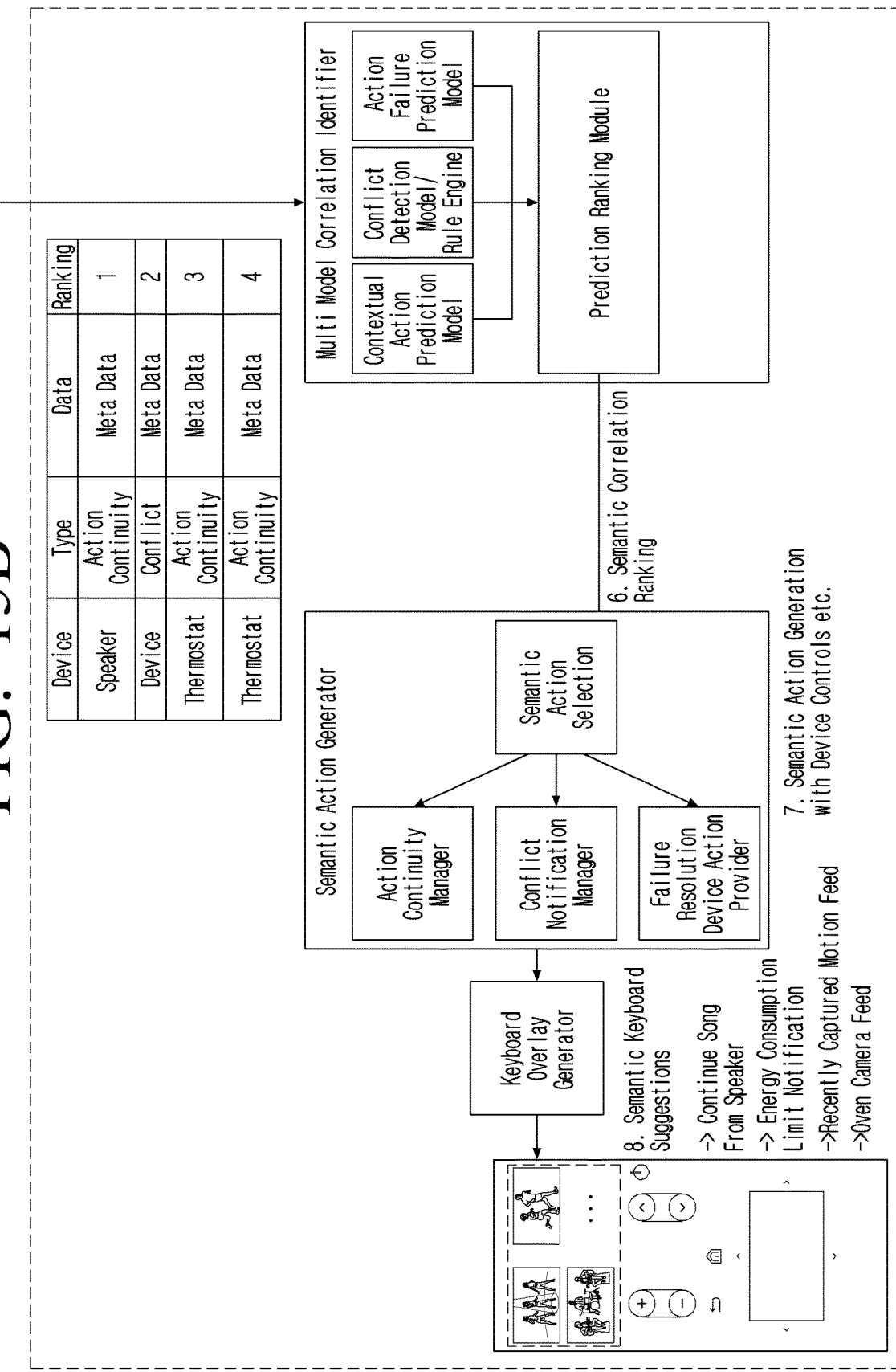
FIG. 15B depicts another use case scenario of controlling operations of one of a plurality of devices in an IoT environment, according to an embodiment of the disclosure.

FIGS. 15A and 15B depict other example use case scenarios of controlling operations of one of a plurality of devices in an IoT environment, according to various embodiments of the disclosure.

Referring to FIGS. 15A and 15B, consider an example scenario, wherein the user points a TV (an example of the first device 104a) using the UWB supported by the electronic device 106. In such a scenario, the electronic device 106 identifies the TV as the pointed device by the user for operating. The electronic device 106 fetches the list of devices that includes, a speaker, a camera, an oven with inbuilt camera, an AC, a water sensor, a smart plug, and a bulb and determines the speaker, the camera, the oven, and the smart plug from the list of devices as the contextually related devices (the second devices 104b-104n) for the TV. The electronic device 106 identifies the type of data to be collected from the TV, the speaker, the camera, the oven, and the smart plug. In an example, the type of data to be collected from the device includes at least one of, a state of the device, a location of the device, a current operating context of the device (such as, a content being played on the speaker, motion and video feed from the camera, a camera feed from the oven, and an energy limit from the smart plug). The electronic device 106 collects the identified type of data from the TV, the speaker, the camera, the oven, and the smart plug, in the online mode or in the offline mode.

Upon collecting the data, the electronic device 106 determines the action continuity feature with the action continuity correlation index, the conflict resolution feature with the conflict resolution correlation index, and the failure resolution feature with the failure resolution correlation index for the speaker, the camera, the oven, and the smart plug with respect to the TV. The electronic device 106 ranks the action continuity feature between the speaker and the TV as 1, the conflict resolution feature between the smart plug and the TV as 2, the action continuity feature between the camera and the TV as 3, and the action continuity feature between the oven and the TV as 4.

The electronic device 106 generates the one or more semantic actions based on the ranking of the correlation features and the data associated with the TV, the speaker, the camera, the oven, and the smart plug. In an example, the semantic actions may include at least one of, a suggestion to continue a song on the TV from the speaker, an energy consumption limit notification, a suggestion to continue displaying a recently captured motion feed by the camera on the TV, and a suggestion to continue displaying the camera feed captured by the camera of the oven on the TV. The electronic device 106 recommends the created one or more semantic actions to the user for operating the TV. The electronic device 106 may recommend the created one or more semantic actions by rending the one or more semantic action as the keyboard overlayed content on the display/outputter 208 of the electronic device 106.

Consider an example scenario, wherein the user points a TV (an example of the first device 104a) using the UWB supported by the electronic device 106. In such a scenario, the electronic device 106 identifies the TV as the pointed device by the user for operating. The electronic device 106 fetches the list of devices that includes, a speaker, a camera, an oven with inbuilt camera, an AC, a water sensor, a smart plug, and a bulb and determines the speaker, the camera, the oven, and the smart plug from the list of devices as the contextually related devices (the second devices 104b-104n) for the TV. The electronic device 106 identifies the type of data to be collected from the TV, the speaker, the camera, the oven, and the smart plug. In an example, the type of data to be collected from the device includes at least one of, a state of the device, a location of the device, a current operating context of the device (such as, a content being played on the speaker, motion and video feed from the camera, a camera feed from the oven, and an energy limit from the smart plug). The electronic device 106 collects the identified type of data from the TV, the speaker, the camera, the oven, and the smart plug, in the online mode or in the offline mode.

Upon collecting the data, the electronic device 106 determines the action continuity feature with the action continuity correlation index, the conflict resolution feature with the conflict resolution correlation index, and the failure resolution feature with the failure resolution correlation index for the speaker, the camera, the oven, and the smart plug with respect to the TV. The electronic device 106 ranks the action continuity feature between the speaker and the TV as 1, the conflict resolution feature between the smart plug and the TV as 2, the action continuity feature between the camera and the TV as 3, and the action continuity feature between the oven and the TV as 4.

The electronic device 106 generates the one or more semantic actions based on the ranking of the correlation features and the data associated with the TV, the speaker, the camera, the oven, and the smart plug. In an example, the semantic actions may include at least one of, a suggestion to continue a song on the TV from the speaker, an energy consumption limit notification, a suggestion to continue displaying a recently captured motion feed by the camera on the TV, and a suggestion to continue displaying the camera feed captured by the camera of the oven on the TV. The electronic device 106 recommends the created one or more semantic actions to the user for operating the TV. The electronic device 106 may recommend the created one or more semantic actions by rending the one or more semantic action as the keyboard overlayed content on the display/outputter 208 of the electronic device 106.

Figure 16A:
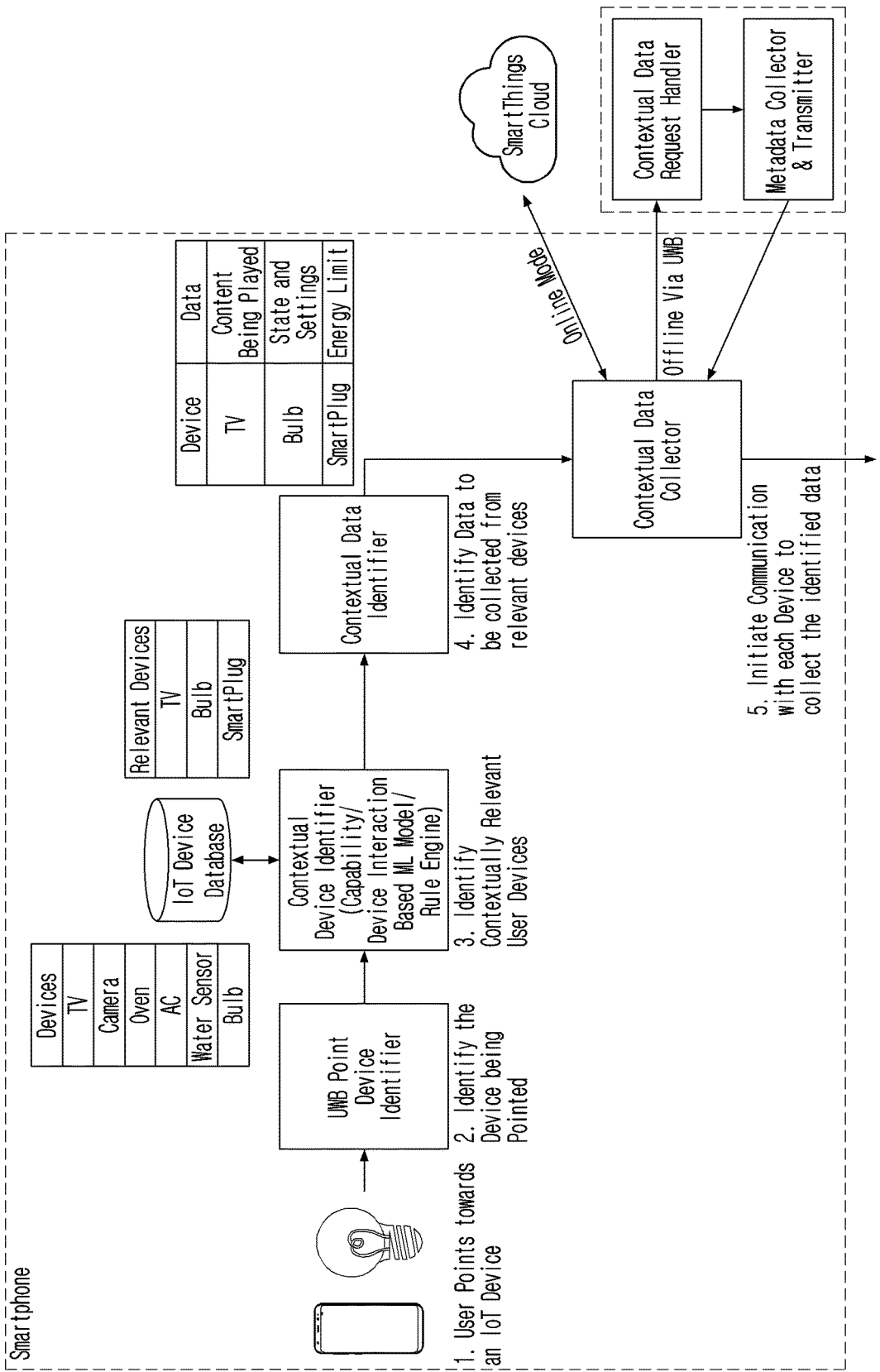
FIG. 16A depicts another use case scenario of controlling operations of one of a plurality of devices in an IoT environment, according to an embodiment of the disclosure.
Figure 16B:
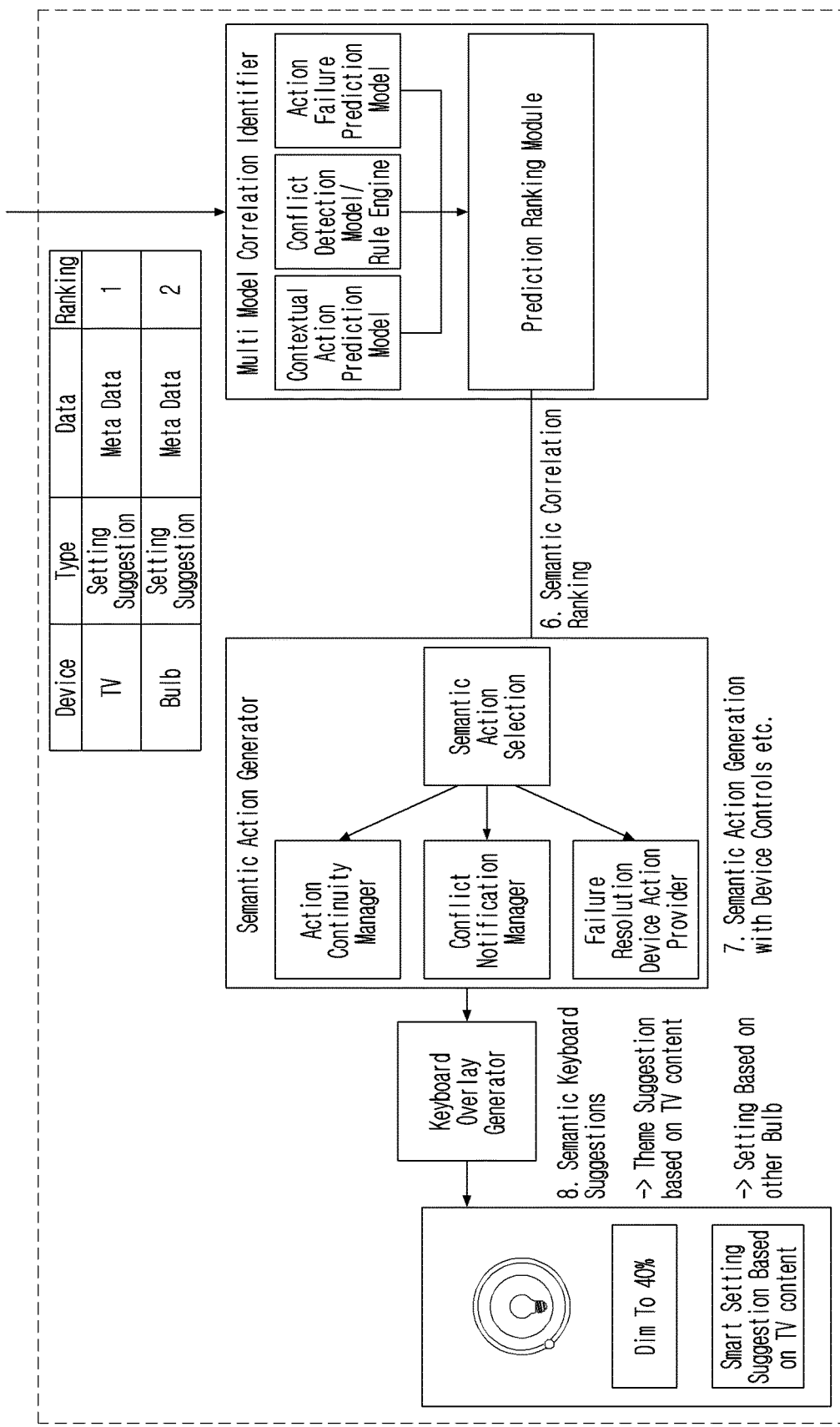
FIG. 16B depicts another use case scenario of controlling operations of one of a plurality of devices in an IoT environment, according to an embodiment of the disclosure.

FIGS. 16A and 16B depict other example use case scenarios of controlling operations of one of a plurality of devices in an IoT environment, according to various embodiments of the disclosure.

Referring to FIGS. 16A and 16B, consider an example scenario, wherein the user points a first bulb (an example of the first device 104a) using the UWB supported by the electronic device 106. In such a scenario, the electronic device 106 identifies the bulb as the pointed device by the user for operating. The electronic device 106 fetches the list of devices that includes, a TV, a speaker, a camera, an oven with inbuilt camera, an AC, a water sensor, a smart plug, and a second bulb positioned in the same location of the first bulb and determines the TV, the second bulb, and the smart plug from the list of devices as the contextually related devices (the second devices 104b-104n) for the bulb. The electronic device 106 identifies the type of data to be collected from the first bulb, the TV, the second bulb, and the smart plug. In an example, the type of data to be collected from the device includes at least one of, a state of the device, a location of the device, a current operating context of the device (such as, a content being played on the TV, a state, and settings from the second bulb, and an energy limit from the smart plug). The electronic device 106 collects the identified type of data from the first bulb, the TV, the second bulb, and the smart plug, in the online mode or in the offline mode.

Upon collecting the data, the electronic device 106 determines the setting suggestion feature with the setting correlation index for the TV, the second bulb, and the smart plug with respect to the first bulb. The electronic device 106 ranks the setting suggestion feature between the TV and the bulb as 1, and the setting suggestion feature between the second bulb and the first bulb as 2.

The electronic device 106 generates the one or more semantic actions based on the ranking of the correlation features and the data associated with the first bulb, the TV, the second bulb, and the smart plug. In an example, the semantic actions may include at least one of, a theme suggestion for the first bulb based on the content being played on the TV, and the settings (for example, brighter or dimmer settings) of the second bulb. The electronic device 106 recommends the created one or more semantic actions to the user for operating the first bulb. The electronic device 106 may recommend the created one or more semantic actions by rending the one or more semantic action as the keyboard overlayed content on the display/outputter 208 of the electronic device 106. Thus, controlling the devices 104a-104n in the IoT environment based on the correlation between the devices 104a-104n may enhance the user experience while controlling the devices.

The embodiments disclosed herein can be implemented through at least one software program running on at least one hardware device and performing network management functions to control the elements. The elements shown in FIGS. 1A, 1B, 2, and 3 can be at least one of a hardware device, or a combination of hardware device and software module.

The embodiments disclosed herein describe methods and systems for controlling operations of devices in an IoT environment. Therefore, it is understood that the scope of the protection is extended to such a program and in addition to a computer readable means having a message therein, such computer readable storage means contain program code means for implementation of one or more operations of the method, when the program runs on a server or mobile device or any suitable programmable device. The method is implemented in a preferred embodiment through or together with a software program written in e.g., Very high-speed integrated circuit Hardware Description Language (VHDL) another programming language, or implemented by one or more VHDL or several software modules being executed on at least one hardware device. The hardware device may be any kind of portable device that may be programmed. The device may also include means which could be e.g., hardware means like e.g., an ASIC, or a combination of hardware and software means, e.g., an ASIC and an FPGA, or at least one microprocessor and at least one memory with software modules located therein. The method embodiments described herein could be implemented partly in hardware and partly in software. Alternatively, the disclosure may be implemented on different hardware devices, e.g., using a plurality of CPUs.

While the disclosure has been shown and described with reference to various embodiments thereof, it will be understood by those skilled in the art that various changes in form and detail may be made therein without departing from the spirit and scope of the disclosure as defined by the appended claims and their equivalents.

What is claimed is:

1. A method for controlling operations of devices in an Internet of Things (IOT) environment, the method comprising:
    identifying, by an electronic device, a first device in response to a user pointing the electronic device toward the first device;
    determining, by the electronic device, at least one second device contextually related to the first device;
    identifying at least one first set of relevant devices for the first device using a capability-based device clustering model;
    fetching a list of registered devices from a device database;
    computing and assigning a confidence score for each registered device with respect to the first device, by matching capabilities of each device with the capabilities of the first device; and
    recommending, by the electronic device, at least one suggestion to control at least one operation of at least one of the first device or the at least one second device, based on a correlation between capabilities of the first device and capabilities of the at least one second device as well as an operation being performed by the at least one second device at a current instant of time,
    wherein the confidence score is based on device interactions between a registered device in the list of registered devices and the first device.

2. The method of claim 1, wherein the electronic device points at the first device by a user using Ultra-Wideband (UWB) supported by the electronic device.

3. The method of claim 1, wherein the determining, by the electronic device, of the at least one second device comprises:
    identifying at least one second set of relevant devices for the first device using a device interaction prediction model;
    creating a union of the at least one first set of relevant devices and the at least one second set of relevant devices, wherein the created union is a set including at least one device present in either the at least one first set of relevant devices or the at least one second set of relevant devices; and
    determining the at least one device present either in the at least one first set of relevant devices or the at least one second set of relevant devices as the at least one second device contextually related to the first device.

4. The method of claim 3, wherein the identifying of the at least one first set of relevant devices for the first device comprises:
    fetching a list of registered devices in the IoT environment from a device database, wherein the device database includes the list of devices registered by the user on deploying each device in the IoT environment and associated capabilities;
    identifying capabilities of the first device and each registered device using the device database; and
    forming a cluster of devices for the first device based on the identified capabilities of the first device and each registered device, wherein the formed cluster of devices includes the at least one first set of relevant devices from the list of devices that has similar capabilities of the first device.

5. The method of claim 3, wherein the identifying of the at least one second set of relevant devices for the first device comprises:
    identifying capabilities of the first device and each registered device using the device database;
    discarding at least one device from the list of registered devices that is associated with a confidence score that is less than a device interaction threshold; and
    identifying at least one set of devices from the list of registered devices that is associated with a confidence score that is greater than or equal to the device interaction threshold as the at least one second set of relevant devices for the first device.

6. The method of claim 1, wherein the recommending, by the electronic device, of the at least one suggestion to control the at least one operation of at least one of, the first device and the at least one second device comprises:
    identifying a type of data to be collected from the first device and the at least one second device, wherein data of each device corresponds to at least one of a state, a content, a location, or a current operating context of the corresponding device;
    collecting the identified type of data from the first device and the at least one second device in an online mode or in an offline mode;
    determining a correlation between the first device and the at least one second device based on the data collected from the first device and the at least one second device and capabilities of the first device and the at least one second device; and
    recommending the at least one suggestion to control the at least one operation of at least one of the first device or the at least one second device based on the determined correlation between the first device and the at least one second device.

7. The method of claim 6, wherein the identifying of the type of data to be collected from the first device and the at least one second device comprises:
    creating at least one device-capability pair, wherein each device-capability pair includes a capability and at least one of the first device or the at least one second device interacting over the capability;
    querying a device capabilities mapping database based on each device-capability pair, wherein the device capabilities mapping database includes a mapping of each of the capabilities with the type of data; and
    receiving the type of data to be collected for each capability corresponding to the at least one of the first device or the at least one second device from the device capabilities mapping database.

8. The method of claim 6, wherein the collecting of the identified type of data from the first device and the at least one second device in the online mode comprises:
- establishing a session with an IoT cloud server, wherein the IoT cloud server collects and stores the data of the first device and the at least one second device;
- sending a data request to the IoT cloud server indicating the type of data required from the first device and the at least one second device; and
- receiving the indicated type of data of the first device and the at least one second device from the IoT cloud server.

9. The method of claim 6, wherein the collecting of the identified type of data from the first device and the at least one second device in the offline mode comprises:
- establishing a session with the first device and the at least one second device using a communication network supported by the electronic device, the first device, and the at least one second device;
- sending a data request indicating the type of data to the first device and the at least one second device; and
- receiving the indicated type of data from the first device and the at least one second device in response to sending the data request.

10. The method of claim 6,
- wherein the determining of the correlation between the first device and the at least one second device comprises determining a plurality of correlation features based on at least one of the capabilities of the first device and the at least one second device, or the data collected from the first device and the at least one second device, and
- wherein the plurality of correlation features includes at least one of an action continuity feature, a conflict resolution feature, a failure resolution feature, or a screen intelligence feature, between the first device and the at least one second device.

11. The method of claim 10, wherein the determining of the action continuity feature between the first device and the at least one second device comprises:
- training an action continuity model, based on a labelled dataset of candidate correlated devices, and associated device context and capabilities; and
- processing the capabilities and the collected data of the first device and the at least one second device using the trained action continuity model to determine the action continuity feature between the first device and each of the at least one second device.

12. The method of claim 11, further comprising:
- determining an action continuity correlation index for each of the at least one second device with respect to the first device by processing the capabilities and the collected data of the first device and each second device, using the trained action continuity model,
- wherein the action continuity correlation index of each second device indicates a probability of continuing at least one action of each of the second device on the first device.

13. The method of claim 10,
- wherein the determining of the conflict resolution feature between the first device and the at least one second device comprises:
  - training a first reinforcement model based on at least one pre-defined conflict policy to detect at least one conflict among operations of the first device and the at least one second device, and
  - processing the data collected from the first device and each of the at least one second device using the trained first reinforcement model to determine the conflict resolution feature between the first device and each of the at least one second device, and
- wherein the conflict resolution feature depicts the at least one conflict among the operations of the first device and each of the at least one second device.

14. The method of claim 13, further comprising:
- determining a conflict correlation index for each second device with respect to the first device by processing the data collected from the first device and each second device using the trained first reinforcement model,
- wherein the conflict correlation index determined for each second device depicts a conflict probability among operations of the first device and each second device.

15. An electronic device comprising:
a memory; and
at least one processor coupled to the memory configured to:
- identify a first device in response to a user pointing the electronic device towards the first device,
- determine at least one second device contextually related to the first device,
- identify at least one first set of relevant devices for the first device using a capability-based device clustering model,
- fetch a list of registered devices from a device database,
- compute and assign a confidence score for each registered device with respect to the first device, by matching capabilities of each device with the capabilities of the first device, and
- recommend at least one suggestion to control at least one operation of at least one of the first device or the at least one second device, based on a correlation between capabilities of the first device and capabilities of the at least one second device as well as an operation being performed by the at least one second device at a current instant of time,
- wherein the confidence score is based on device interactions between a registered device in the list of registered devices and the first device.

16. The electronic device of claim 15, wherein the at least one processor is further configured to:
- identify at least one second set of relevant devices for the first device using a device interaction prediction model,
- create a union of the at least one first set of relevant devices and the at least one second set of relevant devices, wherein the created union is a set including at least one device present in either the at least one first set of relevant devices or the at least one second set of relevant devices, and
- determine the at least one device present either in the at least one first set of relevant devices or the at least one second set of relevant devices as the at least one second device contextually related to the first device.

17. The electronic device of claim 16, wherein the at least one processor is further configured to:
- fetch a list of registered devices in an internet of things (IOT) environment from a device database, wherein the device database includes the list of devices registered by the user on deploying each device in the IoT environment and associated capabilities,
- identify capabilities of the first device and each registered device using the device database, and
- form a cluster of devices for the first device based on the identified capabilities of the first device and each registered device, wherein the formed cluster of devices includes the at least one first set of relevant devices from the list of devices that has similar capabilities of the first device.

18. The electronic device of claim 16, wherein the at least one processor is further configured to:
   identify capabilities of the first device and each registered device using the device database,
   discard at least one device from the list of registered devices that is associated with a confidence score that is less than a device interaction threshold, and
   identify at least one set of devices from the list of registered devices that is associated with a confidence score that is greater than or equal to the device interaction threshold as the at least one second set of relevant devices for the first device.

19. The electronic device of claim 15, wherein the at least one processor is further configured to:
   identify a type of data to be collected from the first device and the at least one second device, wherein data of each device corresponds to at least one of a state, a content, a location, or a current operating context of the corresponding device,
   collect the identified type of data from the first device and the at least one second device in an online mode or in an offline mode,
   determine a correlation between the first device and the at least one second device based on the data collected from the first device and the at least one second device and capabilities of the first device and the at least one second device, and
   recommend the at least one suggestion to control the at least one operation of at least one of the first device or the at least one second device based on the determined correlation between the first device and the at least one second device.

20. The electronic device of claim 15, wherein the at least one processor is further configured to:
   create at least one device-capability pair, wherein each device-capability pair includes a capability and at least one of the first device or the at least one second device interacting over the capability,
   query a device capabilities mapping database based on each device-capability pair, wherein the device capabilities mapping database includes a mapping of each of the capabilities with a type of data, and
   receive the type of data to be collected for each capability corresponding to the at least one of the first device or the at least one second device from the device capabilities mapping database.

21. The method of claim 1, wherein a current operating context includes an operation being performed by the at least one second device at a current instance of time.

* * * * *